(12) United States Patent
Milne

(10) Patent No.: US 8,793,180 B2
(45) Date of Patent: Jul. 29, 2014

(54) RATIO SPREADS FOR CONTRACTS OF DIFFERENT SIZES IN IMPLIED MARKET TRADING

(75) Inventor: Andrew Milne, Maplewood, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 13/543,512

(22) Filed: Jul. 6, 2012

(65) Prior Publication Data

US 2012/0271755 A1    Oct. 25, 2012

Related U.S. Application Data

(63) Continuation of application No. 12/560,122, filed on Sep. 15, 2009, now Pat. No. 8,255,305.

(51) Int. Cl.
*G06Q 40/00* (2012.01)

(52) U.S. Cl.
USPC .................................. 705/37; 705/35; 705/38

(58) Field of Classification Search
USPC ...................................................... 705/35, 38
See application file for complete search history.

(56) References Cited

U.S. PATENT DOCUMENTS

| | | |
|---|---|---|
| 4,677,552 A | 6/1987 | Sibley, Jr. |
| 4,903,201 A | 2/1990 | Wagner |
| 4,980,826 A | 12/1990 | Wagner |
| 5,500,812 A | 3/1996 | Saishi et al. |
| 5,787,402 A | 7/1998 | Potter et al. |
| 6,021,397 A | 2/2000 | Jones et al. |
| 6,047,274 A | 4/2000 | Johnson et al. |
| 6,317,727 B1 | 11/2001 | May |
| 6,321,212 B1 | 11/2001 | Lange |
| 6,347,307 B1 | 2/2002 | Sandhu et al. |
| 6,356,911 B1 | 3/2002 | Shibuya |
| 6,405,180 B2 | 6/2002 | Tifors et al. |
| 6,418,419 B1 | 7/2002 | Nieboer et al. |
| 6,421,653 B1 | 7/2002 | May |
| 6,618,707 B1 | 9/2003 | Gary |
| 6,658,393 B1 | 12/2003 | Basch et al. |
| 6,721,715 B2 | 4/2004 | Nemzow |
| 6,829,589 B1 | 12/2004 | Saliba |
| 6,996,540 B1 | 2/2006 | May |
| 7,039,610 B2 | 5/2006 | Morano et al. |

(Continued)

FOREIGN PATENT DOCUMENTS

| | | |
|---|---|---|
| GB | EP 0407026 A2 | 1/1991 |
| GB | EP 0411748 A2 | 2/1991 |

(Continued)

OTHER PUBLICATIONS

CME Group: COMEX metal futures on the CME Globex Platform, Version: 1.0 , Release: Jan. 19, 2007, pp. 1-6.

(Continued)

*Primary Examiner* — William Rankins
(74) *Attorney, Agent, or Firm* — Lempia Summerfield Katz LLC

(57) ABSTRACT

A method for matching orders is provided. The method includes receiving a first order for a product, the first order specifying a first volume, receiving a second order for the product, the second order specifying a second volume, wherein the first volume is different than the second volume, generating an implied order based on a ratio spread defined between the first order and the second order, and matching a third order with the implied order.

20 Claims, 11 Drawing Sheets

(56) References Cited

U.S. PATENT DOCUMENTS

| | | | |
|---|---|---|---|
| 7,043,457 B1 | 5/2006 | Hansen | |
| 7,089,206 B2 | 8/2006 | Martin | |
| 7,130,789 B2 | 10/2006 | Glodjo et al. | |
| 7,177,833 B1 | 2/2007 | Marynowski et al. | |
| 7,194,481 B1 | 3/2007 | Van Roon | |
| 7,231,363 B1 | 6/2007 | Hughes et al. | |
| 7,246,092 B1 | 7/2007 | Peterson et al. | |
| 7,260,554 B2 | 8/2007 | Morano et al. | |
| 7,280,481 B2 | 10/2007 | Rong | |
| 7,299,208 B1 | 11/2007 | Bailon et al. | |
| 7,542,937 B1 | 6/2009 | Cohen | |
| 7,542,940 B2 | 6/2009 | Burns et al. | |
| 7,542,941 B1 | 6/2009 | Cohen | |
| 7,548,882 B1 | 6/2009 | Pazner | |
| 7,685,052 B2 | 3/2010 | Waelbroeck et al. | |
| 7,933,827 B2 | 4/2011 | Richmann et al. | |
| 8,019,673 B1* | 9/2011 | Rooney | 705/37 |
| 2001/0042785 A1 | 11/2001 | Walker et al. | |
| 2001/0056398 A1 | 12/2001 | Scheirer | |
| 2002/0002530 A1 | 1/2002 | May | |
| 2002/0035531 A1 | 3/2002 | Push | |
| 2002/0070915 A1 | 6/2002 | Mazza | |
| 2002/0077947 A1 | 6/2002 | Ward et al. | |
| 2002/0099651 A1 | 7/2002 | May | |
| 2002/0116314 A1 | 8/2002 | Spencer et al. | |
| 2002/0116317 A1 | 8/2002 | May | |
| 2002/0156719 A1 | 10/2002 | Finebaum et al. | |
| 2002/0169774 A1 | 11/2002 | Greenbaum et al. | |
| 2002/0178102 A1 | 11/2002 | Scheinberg et al. | |
| 2002/0194115 A1 | 12/2002 | Nordlicht et al. | |
| 2003/0004899 A1* | 1/2003 | Bergenudd | 705/400 |
| 2003/0009419 A1 | 1/2003 | Chavez et al. | |
| 2003/0023542 A1 | 1/2003 | Kemp | |
| 2003/0033240 A1 | 2/2003 | Balson et al. | |
| 2003/0050879 A1 | 3/2003 | Rosen et al. | |
| 2003/0069830 A1 | 4/2003 | Morano et al. | |
| 2003/0093360 A1 | 5/2003 | May | |
| 2003/0125892 A1 | 7/2003 | Edge | |
| 2003/0200167 A1 | 10/2003 | Kemp et al. | |
| 2003/0220868 A1 | 11/2003 | May | |
| 2003/0229571 A1 | 12/2003 | May | |
| 2003/0236737 A1 | 12/2003 | Kemp et al. | |
| 2003/0236738 A1 | 12/2003 | Lange et al. | |
| 2004/0015430 A1 | 1/2004 | May | |
| 2004/0015431 A1 | 1/2004 | May | |
| 2004/0039682 A1 | 2/2004 | Sand holm et al. | |
| 2004/0049738 A1 | 3/2004 | Thompson et al. | |
| 2004/0064395 A1 | 4/2004 | Mintz et al. | |
| 2004/0088242 A1 | 5/2004 | Ascher et al. | |
| 2004/0093300 A1 | 5/2004 | Burns | |
| 2004/0103054 A1 | 5/2004 | Singer | |
| 2004/0117302 A1 | 6/2004 | Weichert et al. | |
| 2004/0148242 A1 | 7/2004 | Liu | |
| 2004/0153391 A1 | 8/2004 | Burns | |
| 2004/0153392 A1 | 8/2004 | West et al. | |
| 2004/0153393 A1 | 8/2004 | West et al. | |
| 2004/0153394 A1 | 8/2004 | West et al. | |
| 2004/0172337 A1 | 9/2004 | Spoonhower et al. | |
| 2004/0186806 A1 | 9/2004 | Sinclair et al. | |
| 2004/0210514 A1 | 10/2004 | Kemp et al. | |
| 2004/0236662 A1 | 11/2004 | Korhammer et al. | |
| 2004/0254804 A1 | 12/2004 | Peterfry et al. | |
| 2005/0044027 A1 | 2/2005 | Rodgers et al. | |
| 2005/0080703 A1 | 4/2005 | Chiesa et al. | |
| 2005/0086152 A1 | 4/2005 | Sweeting | |
| 2005/0097026 A1 | 5/2005 | Morano et al. | |
| 2005/0097027 A1 | 5/2005 | Kavanaugh | |
| 2005/0137964 A1 | 6/2005 | Nordlicht et al. | |
| 2005/0165670 A1 | 7/2005 | Woodmansey et al. | |
| 2005/0171890 A1 | 8/2005 | Daley et al. | |
| 2005/0171894 A1 | 8/2005 | Traynor | |
| 2005/0187866 A1 | 8/2005 | Lee | |
| 2005/0203826 A1 | 9/2005 | Farrell et al. | |
| 2005/0246263 A1 | 11/2005 | Ogg et al. | |
| 2005/0283422 A1 | 12/2005 | Myr | |
| 2006/0015436 A1 | 1/2006 | Burns et al. | |
| 2006/0059064 A1 | 3/2006 | Glinberg et al. | |
| 2006/0059065 A1 | 3/2006 | Glinberg | |
| 2006/0059066 A1 | 3/2006 | Glinberg | |
| 2006/0059067 A1 | 3/2006 | Glinberg | |
| 2006/0059068 A1 | 3/2006 | Glinberg | |
| 2006/0059069 A1 | 3/2006 | Glinberg | |
| 2006/0095363 A1 | 5/2006 | May | |
| 2006/0143099 A1 | 6/2006 | Partlow et al. | |
| 2006/0149660 A1* | 7/2006 | Morano et al. | 705/37 |
| 2006/0161498 A1 | 7/2006 | Morano et al. | |
| 2006/0173761 A1 | 8/2006 | Costakis | |
| 2006/0173771 A1 | 8/2006 | Johnston | |
| 2006/0190371 A1 | 8/2006 | Almgren et al. | |
| 2006/0190383 A1 | 8/2006 | May | |
| 2006/0259406 A1 | 11/2006 | Kemp et al. | |
| 2006/0259409 A1 | 11/2006 | Burns et al. | |
| 2006/0265296 A1 | 11/2006 | Glinberg | |
| 2006/0293998 A1 | 12/2006 | Tilly et al. | |
| 2007/0011079 A1 | 1/2007 | May | |
| 2007/0100732 A1 | 5/2007 | Ibbotson et al. | |
| 2007/0112665 A1 | 5/2007 | Mackey et al. | |
| 2007/0239591 A1 | 10/2007 | May | |
| 2007/0282733 A1 | 12/2007 | May | |
| 2008/0010187 A1 | 1/2008 | Farrell et al. | |
| 2008/0077320 A1 | 3/2008 | Loftus et al. | |
| 2008/0077521 A1 | 3/2008 | Sibley et al. | |
| 2008/0086405 A1 | 4/2008 | Sundaram et al. | |
| 2008/0133402 A1 | 6/2008 | Kurian et al. | |
| 2008/0154764 A1 | 6/2008 | Levine et al. | |
| 2008/0183639 A1 | 7/2008 | Disalvo | |
| 2008/0208778 A1 | 8/2008 | Sayyar-Rodsari et al. | |
| 2008/0288386 A1 | 11/2008 | Ferris | |
| 2008/0288391 A1 | 11/2008 | Downs et al. | |
| 2009/0018944 A1 | 1/2009 | DeVerdier | |
| 2009/0063365 A1 | 3/2009 | Pinkas | |
| 2009/0076982 A1 | 3/2009 | Ginberg et al. | |
| 2009/0083175 A1 | 3/2009 | Cushing | |
| 2009/0106133 A1 | 4/2009 | Redmayne | |
| 2009/0157563 A1 | 6/2009 | Serbin et al. | |
| 2009/0228400 A1 | 9/2009 | Burns et al. | |
| 2010/0017321 A1 | 1/2010 | Callaway et al. | |
| 2010/0017323 A1 | 1/2010 | Zimmerman | |
| 2010/0094746 A1 | 4/2010 | MacGregor et al. | |
| 2010/0174633 A1 | 7/2010 | Milne et al. | |
| 2010/0312689 A1 | 12/2010 | Bauerschmidt et al. | |
| 2011/0040669 A1 | 2/2011 | Lee et al. | |
| 2011/0055067 A1 | 3/2011 | Milne et al. | |
| 2011/0055069 A1 | 3/2011 | Pazner | |
| 2011/0066536 A1 | 3/2011 | Milne | |
| 2011/0066567 A1 | 3/2011 | Acuna-Rohter et al. | |
| 2011/0313905 A1 | 12/2011 | Siddall et al. | |
| 2011/0320334 A1 | 12/2011 | Mintz et al. | |

FOREIGN PATENT DOCUMENTS

| | | |
|---|---|---|
| JP | 2000/353196 A | 12/2000 |
| JP | 20011222591 A | 8/2001 |
| WO | WO 03077061 A2 | 9/2003 |

OTHER PUBLICATIONS

FDA, U.S. Department of Health & Human Services: Guidance for Industry: Nutrition Labeling Manual—A guide for developing and using data bases, Mar. 17, 1998, pp. 1-23.

CME Group Product Specific Functionality Version 1.5 Mar. 14, 2012.

U.S. Appl. No. 12/032,379, filed Feb. 2009, Morano et al.

U.S. Appl. No. 12/350,788, filed Jan. 2009, Morano et al.

U.S. Appl. No. 12/533,351, filed Sep. 2009, Milne et al.

International Preliminary Report on Patentability dated Mar. 20, 2012 received in related PCT Application No. PCT/US20101047489.

Blank, John J.: "Implied Trading in Energy Futures," The Journal of Trading, vol. 2, No. 3, pp. 45-48, Summer 2007.

Bolshev, L.N.: "Least Squares, Method of," SpringerLink, Encyclopaedia of Mathematics, 2001, pp. 1-7.

(56) References Cited

OTHER PUBLICATIONS

Office Action in related U.S. Appl. No. 12/579,118, dated Nov. 14, 2011, 13 pages.
Office Action in related U.S. Appl. No. 12/560,026, dated Nov. 14, 2011, 14 pages.
International Search Report dated Dec. 10, 2010 received in related PCT Application No. PCT/US2010/52589.
International Search Report dated Oct. 13, 2010 received in related PCT Application No. PCT/US20101046591.
International Search Report dated Oct. 13, 2010 received in related PCT Application No. PCT/US20101047086.
International Search Report dated Oct. 25,2010 received in related PCT Application No. PCT IU S20 101047489.
International Search Report dated Oct. 14, 2010 received in related PCT Application No. PCT/US20101047075.
Augmenting agent negotiation protocols with a dynamic argumentation mechanism, by Ulrich,Thomas W., D.CS., Colorado Technical University, 2003, 253 pages; AAT 3109037.
PCT/US06/44932 International Search Report Aug. 19, 2008.
PCT/US06/43282 International Search Report May 30, 2008.
PCT IU506/44 702 International Search Report Aug. 17, 2007.
PCT/US06/44917 International Search Report Aug. 28, 2007.
PCT/US06/28001 International Search Report May 7, 2007.
PCT/US06/27762 International Search Report Mar. 9, 2007.
CME® "Clearing Services CME and LCH"; Advisory Notice; http://www.web.archive.org/web/20050306002321/http:/www.cme.com/clearing/rmsl2an/cm/lch . . . , last accessed Feb. 22, 2007; 1 page.
CME® "Clearing Services Layout for Results"; Advisory Notice; http://www.web.archive.org/web/200503081811020/http://www.cme.com/clearinq/rmspan/cm/rec . . . , last accessed Feb. 22, 2007,2 pages.
CME® "Foreign Exchange Products; Trading CME FX Futures: Maximizing the Opportunity for the Individual Investor"; 2005; 6 pages.
CME® "Glossary for Retail FX"; http://www.cme.com/files/FXWebqlossarv.pdf 16 pages.
Position Limit, http://www.investopedia.com/terms/p/positionlimitlasp• 4 pages.
U.S. Commodity Futures Trading Commission; "Security Futures Products Speculative Position Limits"; http://www.cftc.govlindustr⁻oversightlcontractsandl2roducts/sfl2sl2eculativelimits.html;Jul. 26, 2007; 1 page.
U.S. Commodity Futures Trading Commission; "What's New at the CFTC";http://www.cftc.qov/index.html• Mar. 19, 2009; 2 pages.

U.S. Commodity Futures Trading Commission; "Trading Organizations";http://www.cfttc.gov/industr⁻oversign/tradingorganizations.index.html; Mar. 19, 2009; 1 page.
U.S. Commodity Futures Trading Commission; "Clearing Organizations";httl2://www.cftc.gov/indust!yoversightlclearingorganizationslindex.html; Mar. 19, 2009; 2 pages.
Hall "Getting Started in Stocks"; Third Edition; Google Book Search;http://books.google.com/books?id=mA-sSKmB2sC&dg=margin+account+maintenance . . . ;Sep. 26, 2008; pp. 105-114; Coughlan Publishing; 1997.
K. Balasubramanian et ai, "Developing Applications Using Model-Driven Design Environments", IEEE Computer, Feb. 2006 (vol. 39, No. 2).
K. Chen et ai, "Towards Formalizing Domain-specific Modeling Languages", Vanderbilt University Institute for Software Integrated Systems, presented at the Object Management Group (OMG) OMG's First Annual Model-Integrated Computing Workshop, 2004.
G. Guizzardi et ai, "On the role of Domain Ontologies in the design of Domain-Specific Visual Modeling Languages", Proceedings of the 1 ih ACM Conference on Object-Oriented Programming, Systems, Languages and Applications (OOPSLA 2002), Seattle, USA, 2002, Helsinki School of Economics Printing, Working Paper Series @-334 (ISSN 1235-5674),downloaded from Centre for Telematics and Information Technology, University of Twente,The Netherlands.
G. Guizzardi et ai, "Ontology-Based Evaluation and Design of Domain-Specific Visual Modeling Languages", Proceedings of the 14th International Conference on Information Systems Development, Karlstad, Sweden, 2005.
G. Karsai et ai, "Model-Integrated Development of Embedded Software", Proceedings of the IEEE, Jan. 2003, vol. 91, No. 1.
D. Schmidt, "Model-Driven Engineering", IEEE Computer Feb. 2006; vol. 39, No. 2.
PEAKE, The National Book System, an Electronically Assisted Auction Market, pp. 02290-pp. 02353 (Apr. 30, 1976).
INTEX, The International Futures Exchange (Bermuda) Limited, Functional Specifications,pp. 01932-pp. 01999 (Aug. 1981).
Australian Patent Examination Report No. 1, from related Australian Application No. 2010295889, Mar. 8, 2013, AU.
Patent Examination Report No. 2 from related Australian Application No. 2010295889, Nov. 25, 2013, AU.
Patent Examination Report No. 3, from Australian Application No. 2010295889, May 5, 2014, AU.

* cited by examiner

RATIO SPREADS FOR CONTRACTS OF DIFFERENT SIZES IN IMPLIED MARKET TRADING

RELATED APPLICATIONS

This application is a continuation under 37 C.F.R §1.53(b) of U.S. patent application Ser. No. 12/560,122 filed on Sep. 15, 2009, now U.S. Pat. No. 8,255,305, which is hereby incorporated by reference.

This application is related to U.S. patent application Ser. No. 10/700,406, filed Nov. 4, 2003, which is incorporated herein by reference in its entirety.

This application is related to U.S. patent application Ser. No. 11/368,966, filed Mar. 6, 2006, which is a division of U.S. patent application Ser. No. 09/971,172, filed on Oct. 4, 2001, all of which are incorporated herein by reference in its entirety.

This application is related to U.S. patent application Ser. No. 12/032,379, filed Feb. 15, 2008, which is incorporated herein by reference in its entirety.

This application is related to U.S. patent application Ser. No. 12/350,788, filed Jan. 8, 2009, which is incorporated herein by reference in its entirety.

This application is related to U.S. patent application Ser. No. 12/553,351, filed Sep. 3, 2009, which is incorporated herein by reference in its entirety.

This application is related to U.S. patent application Ser. No. 12/560,026, filed on Sep. 15, 2009 which is incorporated herein by reference in its entirety.

This application is related to U.S. patent application Ser. No. 12/560,145, filed on Sep. 15, 2009 which is incorporated herein by reference in its entirety.

BACKGROUND

Electronic trading systems offer contracts for trade. Traders place orders for the contracts. Orders that are entered into the electronic trading system by traders are real orders. Real orders may be entered for any tradable contract including, but not limited to, futures, options, inter-commodity spreads, intra-commodity spreads, futures strips, calendar spreads, butterfly spreads, condor spreads, crack spreads, straddles, and strangles. Traders enter the appropriate information, for example, tradable item, bid price, or month, into the electronic trading systems when placing an order.

Implied orders, unlike real orders, are generated by electronic trading systems on behalf of traders who have entered real orders. In other words, implied orders are computer generated orders derived from real orders. For example, an implied spread may be derived from two real orders. The system creates the "derived" or "implied" order and provides the implied order as a market that may be traded against. If a trader trades against this implied order, then the real orders that combined to create the implied order and the resulting market are executed as matched trades.

Implied orders generally increase overall market liquidity. The creation of implied orders increases the number of tradable items, which has the potential of attracting additional traders. Additionally, implied orders may have better prices than the corresponding real orders in the same contract. This can occur when two or more traders incrementally improve their order prices in hope of attracting a trade. Combining the small improvements from two or more real orders can result in a big improvement in the implied order. In general, advertising implied orders at better prices will encourage traders to enter the opposing orders to trade with them. Exchanges benefit from increased transaction volume. Transaction volume will increase as the number of matched trade items increases.

Electronic trading systems conventionally only offered full size contracts for trade. However, in order to increase liquidity, small contracts have now been offered. A "small contract" is a contract that has a size, volume, quantity, or other specification that is smaller than the full size contract. Traders of small contracts are limited to trading with other traders of small contracts. It is not possible for small contracts to be exchanged with full size contracts nor for small contracts to participate in trades with combination contracts defined in terms of the full size contract. As a result, the smaller market participants do not benefit fully from the liquidity in the full size contracts.

DETAILED DESCRIPTION

Figure 1:
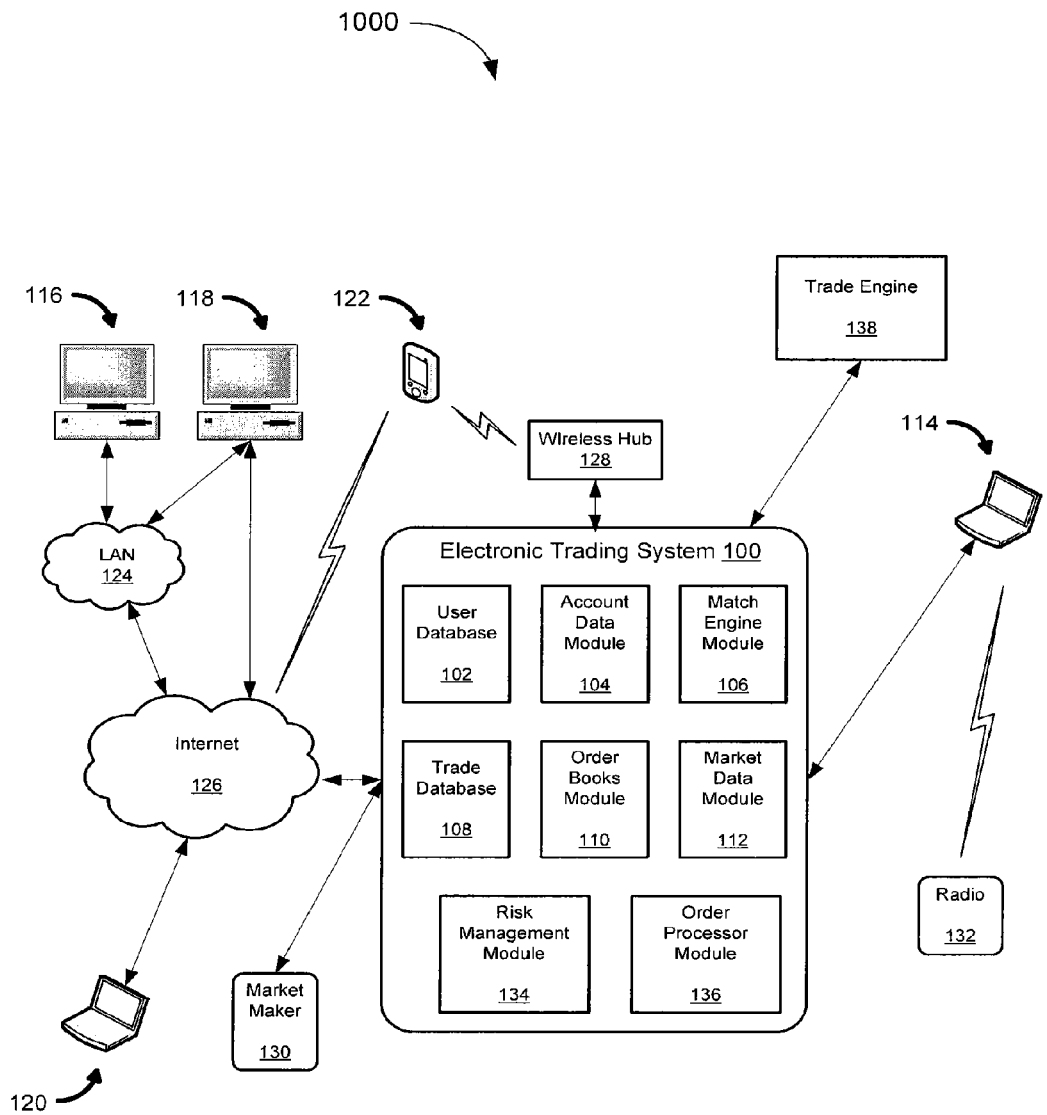
FIG. 1 illustrates an exemplary trading network environment.

The present embodiments relate to providing liquidity in a full size contract to a trader of one or more small contracts. The size (e.g., volume) of a full size contract is defined by an exchange, government entity, or other organization group. Small contracts are contracts that have a size, volume, quantity, or other specification that is smaller than the full size contract. The size of the small contract may also be defined by an exchange, government entity, or other organization group. The present embodiments relate to generating ratio spreads that may be used in implied market trading. As used herein, a ratio spread includes a spread between two contracts of different sizes. In order to increase liquidity to traders of small contracts, ratio spreads are created with tradable volumes being determined by lot points assigned to each linked contract. As a result, small contract traders may now trade with full size contract traders. This increases overall market liquidity.

Although referred to herein as a full size contract and a small contract, other names may be used for these types of contracts. For example, full size contracts may be referred to as a large contracts, full lot contracts, or full size contracts. Small contracts may be referred to as mini contracts, proportional contracts, or emini contracts. Other names, representations, or identifications may be used.

In one aspect, a method for matching orders is provided. The method includes receiving one or more real orders via a communication network; generating an implied order, one or more components of the implied order being a ratio spread linking two contracts that have been specified with a common product but with trading units of different sizes; and matching the one or more orders with other real orders or the implied order.

In a second aspect, a match engine for matching orders is provided. The match engine includes an input, a processor, and an output. The input is configured to receive one or more new orders. The processor is configured to receive the one or more new orders and generate an implied order. One or more components of the implied order may be a ratio spread linking two contracts that have been specified with a common product but with trading units of different sizes. The implied order may be generated based on the one or more new orders. The output may be configured to receive the implied order from the processor and transmit the implied order to a trade machine used for placing trades.

In a third aspect, a match engine is provided. The match engine includes an input configured to receive one or more new orders; a processor configured to receive the one or more new orders and generate an implied order, one or more components of the implied order being a ratio spread linking two contracts that have been specified with a common product but with trading units of different sizes, the implied order being generated based on the one or more new orders; and an output configured to receive the implied order from the processor and transmit the implied order to a trade machine used for placing trades.

In a fourth aspect, a computer-readable medium encoded with computer executable instructions is provided. The computer executable instructions executable with a processor. The computer-readable medium including instructions executable to receive one or more real orders via a communication network; instructions executable to generate an implied order, one or more components of the implied order being a ratio spread linking two contracts that have been specified with a common product but with trading units of different sizes; and instructions executable to match the one or more orders with other real orders or the implied order.

In a fifth aspect, a trading network environment is provided. The trading network environment includes one or more trading workstations for entry of a plurality of orders; a communication network coupled to the trading workstations; and a trade matching system coupled to the communication network, wherein the trade matching system generates an implied order wherein one or more components of the implied order is a ratio spread linking two contracts that have been specified with a common product but with trading units of different sizes.

FIG. 1 illustrates one embodiment of a trading network 1000. The trading network 1000 includes an electronic trading system 100, computer devices 114, 116, 118, 120 and 122, one or more market makers 130, a radio 132, and a trade engine 138. The electronic trading system 100 may be coupled with the computer devices 114, 116, 118, 120 and 122, one or more market makers 130, radio 132, and trade engine 138. As used herein, the term "coupled with" includes directly connected or indirectly connected through one or more intermediary components. The intermediary components may include networks, hardware components, and/or software components.

The trading network 1000 may be used to place and fill orders for contracts, such as outright contracts and spread contracts. Outright contracts are defined by a product and a delivery period, such as a calendar month. Spread contracts are defined as the simultaneous purchase and sale of two independent contracts. Although these contracts could themselves be spread contracts, it is more common for them to be outright contracts that cannot be further decomposed. Spread contracts may be a calendar spread between futures contracts for different months and intercommodity spreads between futures contracts in the same month but for different commodities. The bid component and the offer component of a spread are termed the bid leg and the offer leg. Other combination contracts are possible and may also be used to spread liquidity, although for linking small contracts with full size contracts, only spreads may be necessary.

The electronic trading system 100 may be a server, supercomputer, personal computer, central processing system, or other processor that receives and matches orders. The electronic trading system 100 may be owned, managed, controlled, monitored, programmed, sold, or used by an exchange. The exchanges may be a regulated or unregulated exchange or other electronic trading service making use of electronic trading systems. For example, the exchange may include the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

Computer devices 114, 116, 118, 120 and 122 may be personal computers, servers, mobile devices, programmed computing devices, networked computing systems, or other electronic devices that may be used to transmit orders to the electronic trading system 100. The computer devices 114, 116, 118, 120 and 122 may include a central processor that controls the overall operation of the computer and a system bus that connects the central processor to one or more conventional components, such as a network card or modem. Each computer device 114, 116, 118, 120 and 122 may also include a variety of interface units and drives for reading and writing data or files. Depending on the type of computer device, a trader can interact with the computer using an input, such as a keyboard, pointing device, microphone, pen device or other input device. The input may be used for defining a trade.

Computer device 114 is shown directly connected to electronic trading system 100. Electronic trading system 100 and computer device 114 may be connected via a Ti line, a common local area network (LAN) or other mechanism for connecting computer devices. Computer device 114 is shown connected to a radio 132. The user of radio 132 may be a trader or exchange employee. The radio user may transmit orders or other data to the trader using computer device 114. The trader using computer device 114 may transmit a trade or other data to electronic trading system 100.

Computer devices 116 and 118 are coupled to a local area network (LAN) 124. LAN 124 may have one or more local area network opologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with electronic trading system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, digital subscriber line (DSL), satellite dish or any other device for connecting a computer device to the Internet.

A trader, for example, using one or more of the computer devices 114, 116, 118, 120 and 122 may place an order for one or more contracts. The order may be a real order. Real orders are orders that are entered into the electronic trading system 100 by traders. Traders provide the appropriate data to the electronic trading system 100 and release the order into the system as an open order, i.e., an order that has not yet been matched. Real orders may be entered for any tradable item in the system including, but not limited to, futures, options, inter-commodity spreads, intra-commodity spreads, futures strips, and so forth. The computer devices 114, 116, 118, 120 and 122 may include processors and memories for placing orders.

Implied orders, unlike real orders, are generated by the exchange, for example, using the electronic trading system 100, on the behalf of traders who have entered real orders. For example, an implied spread may be derived from two real outrights. The electronic trading system 100 calculates the implied order and displays the price level and available volume in the appropriate contract. This may be referred to as an implied market rather than an implied order on the understanding that a given price level may include more than one actual order at the same price. If a trader enters a real order to trade against the implied order, then the input order and the real orders that are combined to create the implied order all receive fills, with the buys and sells being reported as matched trades.

The electronic trading system 100 receives orders and transmits market data related to orders and trades to users. Electronic trading system 100 may be implemented with one or more mainframe, desktop or other computers. A user database 102 includes data identifying traders and other users of electronic trading system 100. Data may include user names and passwords. An account data module 104 may process account data that may be used during trades. A match engine module 106 is included to match bid and offer prices. Match engine module 106 may be implemented with software that executes one or more algorithms for matching bids and offers. A trade database 108 may be included to store data identifying trades and descriptions of trades. In particular, a trade database may store data identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

One or more market makers 130 may maintain a market by providing constant bid and offer prices for a derivative or security to electronic trading system 100. Electronic trading system 100 may also exchange data with other trade engines, such as trade engine 138. One skilled in the art will appreciate that numerous additional computers and systems may be coupled to electronic trading system 100. Such computers and systems may include clearing, regulatory and fee systems.

The operations of computer devices 114, 116, 118, 120 and/or 122 the electronic trading system 100 may be controlled by computer-executable instructions stored on computer-readable medium. For example, computer device 116 may include computer-executable instructions for receiving order data from a trader and transmitting that order data to electronic trading system 100. In another example, computer device 118 may include computer-executable instructions for receiving market data from electronic trading system 100 and displaying that data to a user.

Electronic trading systems 100 in major exchanges are typically implemented with distributed architectures, with the order matching function being performed by a specialized component referred to as the Match Engine Module 106 (hereinafter, Match Engine 106). The electronic trading system 100 may have one or more Match Engine 106. Each Match Engine 106 is a specialized order matching component that receives real orders, generates implied orders, stores the orders, calculates tradable combinations and advertises the availability of real and implied orders in the form of market data. Traders respond to the market data by sending additional real orders, which are received by the Match Engine 106, which then attempts to match the received orders with previously received or generated orders or combinations thereof. The Match Engine 106 executes the possible trades, for example, by matching the orders, and communicates the results.

The operations of the Match Engine 106 may be performed in more than one part of a trading network 1000 or in related systems. For example, the calculation of implied orders may be done by traders at their trading stations in search of arbitrage opportunities between trading networks or match engines. It is also possible to perform these calculations outside the trading network 1000 for the evaluation of possible trading strategies, for instruction, regulation or in the solution of other problems where trading is used as a model.

Figure 2:
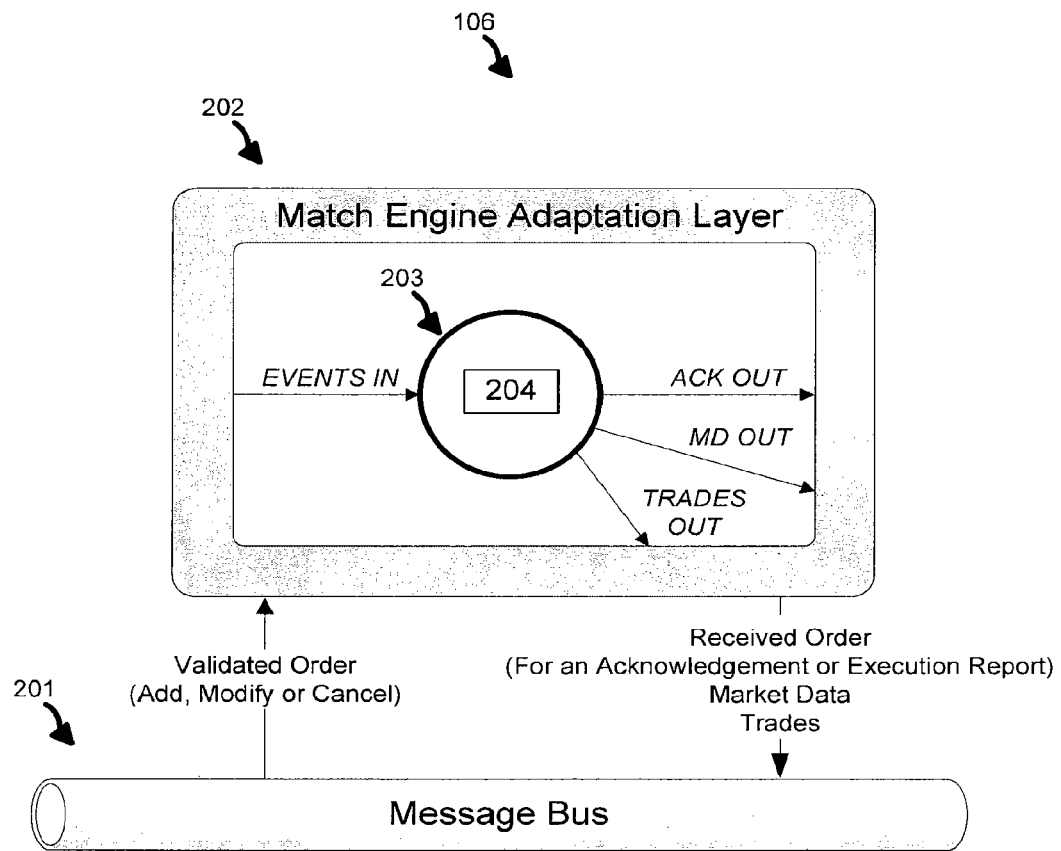
FIG. 2 illustrates an exemplary match engine architecture where the match engine is connected to other components of the trading network environment by a message bus.

As shown in FIG. 2, the Match Engine 106 may have a layered architecture. The Match Engine 106 may include a Match Engine Adaptation Layer 202 (hereinafter, the "Adaptation Layer 202"). The Adaptation Layer 202 translates incoming messages into events that can be processed by a Match Engine Core (hereinafter, "Core") 203. The Core 203 includes an Implicator 204. The Implicator 204 is operable to perform implication. Implication makes use of real orders to spread liquidity. The Match Engine 106 communicates with other components using a message bus 201. The output messages from the Core 203 are translated by the Adaptation Layer 202 back into messages that can be transmitted to other parts of the trading system using the message bus 201.

The Implicator 204 may be program code that calculates implied orders. Although this example shows the Implicator 204 as part of a Match Engine 106 in an electronic trading system, the Implicator 204 may be used in any electronic trading system where implied orders need to be calculated. The Implicator 204 operates on a group of tradable instruments referred to as an implication group. In an implementation for futures trading, an implication group consists of outright contracts and combination contracts that can trade with each other. An outright contract is defined by a product and a delivery period. A combination contract is defined by two or more outright contracts which are referred to as legs. The simplest of these combination contracts is the calendar spread, which is a contract to buy a product in one delivery period and sell it in another. Another simple combination contract is the intercommodity spread, which is a contract to buy one product in a delivery period and sell another product in the same delivery period. The simplest possible implication group consists of two outrights and the spread between them. It is understood that implication groups may be of arbitrary size and that combination contracts may be defined in terms of other combination contracts so long as all of the required legs are present in the implication group. It is understood that the concepts of outright and combination are applicable to a wide range of tradable instruments. It is understood that the product code given without a specific delivery month is a convenient shorthand for all of the contracts in that product or for an arbitrary contract used as an example, depending on the context. It is understood that the year may be omitted if the context makes it clear that a month-of-the-year is being used in the example rather that a specific date, such as CLF:CLJ indicating a generic three-month spread in CL between the months of January (F) and April (J).

The Core 203 and/or the Implicator 204 may be implemented in a programming language such as Java or C++ that allows multiple threads of execution and that a program with multiple threads may be executed on a computing system with multiple central processing units (CPU). In such an implementation, the threads may be designed or configured to execute in parallel and the time taken to execute all of the threads can be as short as the time taken by the single longest thread. If there are more threads than CPUs, then the execution time will depend on how many threads must be executed sequentially on each CPU. The Core 203 may be implemented in such a language and that the calculation of implied orders by the Implicator will be accelerated by performing many independent calculations in parallel on separate threads.

When there are different trading units, currencies or other factors affecting the price, the Adaptation Layer 202 may associate external trading system prices in units like barrels and gallons with machine prices in scaled units that are internal to the Core 203 and common to all the contracts in the implication group. When ratio spreads are used to connect contracts with different volume units or size specifications, the Adaptation Layer 202 may also associate external quantities with internal scaled units that are also internal to the Core 203 and common to all the contracts in the implication group.

Referring back to FIG. 1, the Match Engine 106 may perform match engine setup. Performing match engine setup may include defining a full size contract, defining one or more small contracts, calculating ratio spreads, defining special orders, loading persistent orders, or any combination thereof. Match engine setup may include additional, different, or fewer acts than necessary or desirable for defining the contracts, spread and orders.

In order to define the full size contract and/or one or more small contracts, the Match Engine 106 may read a security definition message. Security definition messages may be formatted according to the financial information exchange (FIX) protocol. The Match Engine 106 may access, request and/or receive the security definition message and/or the contract definitions therein from one or more databases or files that the trading system uses to inform traders of the instruments that can be traded. Once obtained, the Match Engine 106 may read the security definition messages and define the contracts defined therein.

In one embodiment, the Match Engine 106 may use the FIX protocol to request and receive a security definition message. For example, the Match Engine Module 106 may transmit a security definition request, formatted according to the FIX protocol, to the Market Data Module 112. In response to the definition request, the Market Data Module 112 may publish a security definition message according to the FIX protocol. The FIX protocol is a series of messaging specifications for the electronic communication of trade-related messages. The FIX protocol has been developed through the collaboration of banks, broker-dealers, exchanges, industry utilities and associations, institutional investors, and information technology providers from around the world. FIX is an industry-driven messaging standard used for transactions in an electronic, transparent, cost efficient and timely manner. The FIX Adapted for STreaming (FAST) Protocol may be used with the FIX protocol. The FAST protocol has been developed as part of the FIX Market Data Optimization Working Group. FAST is designed to optimize electronic exchange of financial data, particularly for high volume, low latency data dissemination.

In alternative embodiments, the Match Engine 106 may use other techniques to obtain the security definition message or the definitions therein. For example, a system administrator may input the definitions using an input device, such as a keyboard, mouse, touchpad, or other device. In another example, the Match Engine 106 may access a database, such as the User Database 102 or Trade Database 108.

As used herein, the term "defining the . . . contract" may include making the contract available to traders. In other words, once the contract is defined, the Match Engine 106 has the capability of matching buy orders in the contract with sell orders in the same contract, an operation referred to as making a real trade. In a real trade, the Match Engine 106 receives a new order and matches it with a previously received order on the opposite side of the same contract that is resting on the order book. The Match Engine 106 may also have the capability of matching new orders with combinations of resting orders that are linked by the definitions of their contracts, an operation referred to as making an implied trade. There is no limit on the number of contracts that may be linked together. The Match Engine 106 may go through the contract definitions and determine which combinations are possible and which of these should be calculated and published during the trading state. Accordingly, once defined, the contracts and the properties form the basis of the Match Engine 106 order book state. An order book state, with tradable contracts defined, but no orders, is referred to as being in the empty state. When orders arrive to buy and sell various quantities of the different contracts at various prices, the order book state is further defined by the prices, sides and quantities of the resting orders.

The Match Engine 106 may establish an order book from which implied orders can be calculated and published. The order book may be established using the security definition message or contract definitions therein. The sizes of the contacts may be defined by an exchange. For example, the New York Mercantile Exchange (NYMEX) offers a contract for 500 barrels of West Texas Intermediate Crude Oil, referred to in its specification as "light sweet crude." The contract for 500 barrels of light sweet crude has a trading symbol of "QM" and may be referred to herein using the QM symbol. NYMEX also offers a contract for 1000 barrels of light sweet crude. This contract has a trading symbol of "CL" and may be referred to herein using the CL symbol. The Exchange may define other sizes as well.

Figure 3:
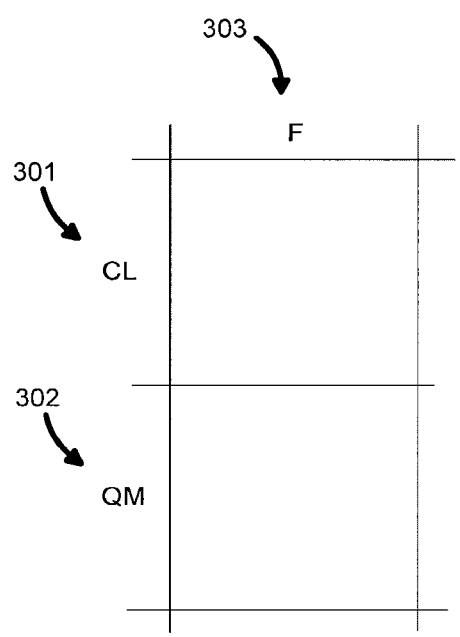
FIG. 3 illustrates a visual technique used to represent contracts that can be traded by the match engine.

FIG. 3 illustrates an order book with two contracts defined, specifically the CL contract and the QM contract for the delivery month of January. The first row 301 corresponds to a contract for the CL contract and the second row 302 corresponds to the QM contract. The column 303 corresponds to the delivery month of January in a given year, represented symbolically by "F". Accordingly, the CL contract having a delivery month of January may be represented symbolically as CLF and the QM contract having a delivery month of January may be represented symbolically as QMF The QM contract is aimed at smaller market participants that want a lower cost instrument traded in a liquid market. The QM contract is financially settled, with its value on expiry determined by the settlement price of the 1000 barrel CL contract at the close of business on the last day that the QM contract is traded. However, in prior art systems, the full liquidity of the full size contract is not available to the small contract trader because the QM seller can only sell to a QM buyer. It was previously not possible for a QM seller to sell to a CL buyer, nor could a CL and QM be combined in an implied market to take advantage of liquidity in other products or delivery months. Because of the limited nature of the QM contract, the small contract trader had to be willing to incur additional costs and risk.

Referring back to FIG. 1, match engine setup, which may be performed by the Match Engine 106, may also include calculating ratio spreads. The Match Engine 106 may define or calculate a ratio spread. Defining the ratio spread contract may include assigning lot points to one or more of the contracts. The number of lots points assigned to a small contract may be based on the volume of the small contract relative to the volume of the full size contract, as well as the number of lot points assigned to the full size contract. The number of lot points assigned to the full size contract may be such that the number of lot point for the full size contract is the least common multiple of the lot points assigned to the one or more small contracts.

Table 1 illustrates one example of assigning lot points to contracts CL and QM, which are shown in FIG. 3. Contract CL corresponds to the New York Mercantile Exchange's West Texas Intermediate Crude Oil Contract RB is assigned 60 lot points. Contract QM, which has half the volume as contract CL, is assigned half the lot points (i.e., 30 lot points). Hypothetical contract CL6, which has a tenth of the volume as contract CL, is assigned a tenth of the lot points as contract RB (i.e., 6 lot points).

TABLE 1

| CONTRACT (West Texas Intermediate Crude Oil) | VOLUME OF CONTRACT (gallons) | LOT POINTS ASSIGNED TO CONTRACT |
|---|---|---|
| CL | 1000 | 60 lot points |
| QM | 500 | 30 lot points |
| CL6 | 100 | 6 lot points |

As shown in Table 1, the full size contract, which is contract CL, is assigned a number of lot points that is a least common multiple of the number of lot points for the other two contracts QM and CL6. The procedure is illustrated here for a simple group of contracts with the same underlying physical unit. It is understood that other physical units such as barrels, metric tons, British Thermal Units, kilowatt hours and so forth can be accommodated to any desired accuracy by making the number of lot points in the biggest contract sufficiently large.

The lot points may be used to calculate ratio spreads for combination contracts. For example, based on the number of lot points assigned to the contract CL (i.e., 60 lot points) and the number of lot points assigned to the contract CL6 (i.e., 6 lot points), the Match Engine 106 may calculate that the combination contract CL:CL6 has a ratio spread of 1:6. In other words, one (1) CL contract is being bought and six (6) CL6 contracts are being sold. The convention of buying multiple small contracts and selling one big (or vice versa) will always be clear from the context. Those of skill in the art will appreciate that an exchange can express one convention externally, such as "buy the ratio spread" means "buy the full size contract and sell the mini" while maintaining different conventions internally to simplify the arithmetic of implication.

The number of lot points assigned to each contract and/or the ratio spreads may be stored in memory for later use. As will be discussed below, the number of lot points assigned to each contract and/or the ratio spreads may used to determine the volume of implied orders for contracts of different sizes.

The Match Engine 106 may load persistent orders during match engine setup. Persistent orders may be past orders that were not completely filled in a previous trading sessions but whose properties require them to be carried forward to the subsequent session. For example, persistent orders include good-through-date (GTD) or good-till-canceled (GTC) orders. In one embodiment, the Match Engine 106 may update the Order Books Module 110 as orders are entered, modified, canceled or filled during the trading session. At the end of the trading session, the Order Books Module 110 removes orders that do not have the properties of persistence. During the setup state for the subsequent session, the Match Engine 106 sends a query to the Order Books Module 110 or an associated database, obtains the data for the persistent orders in the form of a record set, iterates the record set and stores the orders internally in the data structures used to represent the order book.

The Match Engine 106 may also define one or more special orders. Special orders are matched and traded in the same way as ordinary orders but are coded in such a way that the Match Engine 106 can apply special rules not available to ordinary traders, but which allow the Match Engine's 106 generic order matching logic to be used for other exchange business needs. For example, the Match Engine 106 can define special orders that will only trade as components in an implied combination, which would allow the engine to maintain orders in spread contract where the bid price is identical to the asking price or fractionally better. This technique could be used to automatically convert bids for one contract into bids for a linked contract through simple implication. Exemplary special orders include ratio spread orders with special properties such as zero prices and infinite volumes. However, other special orders may be used, such as orders with slightly different lot point volumes or internally scaled prices to express differences in trading priority that are recognizable to the match engine but invisible to the outside world when the prices and volumes are rounded to standard values. Special orders are useful because they reduce the amount of computer program code and subsequent testing required to implement new trading system requirements.

Defining one or more special orders may include loading the special orders from a database. The special orders may be read in the same way as persistent orders, for example, from the Order Books Module 110. In one embodiment, the special orders are previously entered into the database using a program designed for this purpose and the codes used to identify the special orders are checked by the match engine when the database is being read. The match engine loads only the orders whose codes it has been programmed to recognize and informs the operator of the trading system if orders with unrecognizable codes have been encountered.

The Match Engine 106 may display ratio spreads along with the combination contracts. Displaying the ratio spreads may include sending ratio spread data to one or more computer devices, such as computer devices 114, 116, 118, 120 and 122. The one or more computer devices may receive the ratio spread data and display a representation of the ratio spreads on a monitor for a broker or other trading entity to view. Displaying the ratio spreads is not necessary. For example, the ratio spread data may be transmitted to a computer device and processed automatically by the computer device.

A trader or trading entity may view the ratio spreads and decide that it is advantageous, either financially or strategically, to place an order for one or more of the ratio spreads.

Once match engine setup has been performed, the Match Engine 106 may enter a trade state. In the trade state, the Match Engine 106 may receive one or more orders, match the orders with other orders, and publish the market data.

Buy and sell orders for the tradable contracts may be read from a database such as User Database 102 or Trade Database 108, received from computer devices 114, 116, 118, 120 and 122 or created by the Match Engine 106 according to its programmed instructions, for example, to create implied orders. The orders resting in the Match Engine 106 define the order book state. When the order book does not have any resting orders, the Match Engine 106 is considered to be in the empty state. However, when the order book has orders, the Match Engine 106 is considered to be in the trade state.

Figure 4:
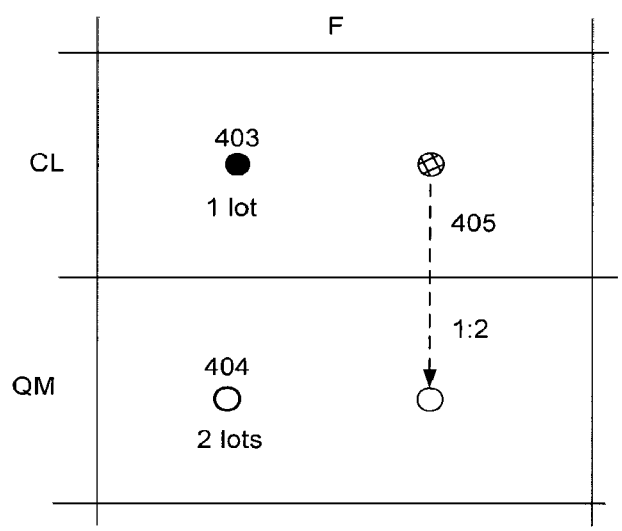
FIG. 4 illustrates a visual technique used to represent orders to buy and sell the contracts of FIG. 3 when these orders are resting in the match engine and available to trade with incoming orders. Both real and implied orders are shown.

FIG. 4 illustrates an order 401 to buy one lot of CLF and an order 402 to sell two lots of QMF. The combination order may be a spread contract and imply a 1:2 ratio spread 405. The order to buy CLF is represented by the solid circle 403 and the order to sell QMF is represented by the open circle 404. The CLF:QMF ratio spread, which is a combination order to buy 1 lot of CLF and sell two lots of QMF, is represented by a cross-hatched circle and an open circle connected by the dashed line 405. The ratio spread is designated 1:2 to indicate that one lot is bought and two lots are sold although it is understood that this notation may be dropped when the meaning is clear.

Buy and sell orders for the tradable contracts may be read from a database such as User Database 102 or Trade Database 108, received from computer devices 114, 116, 118, 120 and 122 or created by the match engine itself according to its programmed instructions. The orders resting in the match engine define its order book state.

If the Exchange does not define CLF:QMF (1:2) as a tradable contract it is still possible for speculators to "trade the spread". For example, a speculator can calculate its current value from the market data published by the exchange and estimate whether money could be made by selling one lot of CLF, buying two lots of QMF and holding the two positions until they can be liquidated to advantage. The speculator will then offer to buy and sell the CLF and QMF contracts according to his or her estimate of how their prices will change over time. The speculator's profit comes at the expense of the small volume hedger and although this is the speculator's legitimate compensation for assuming the risk of adverse price movements, it can run counter to the exchange's larger goal of attracting more small hedgers.

Figure 5A:
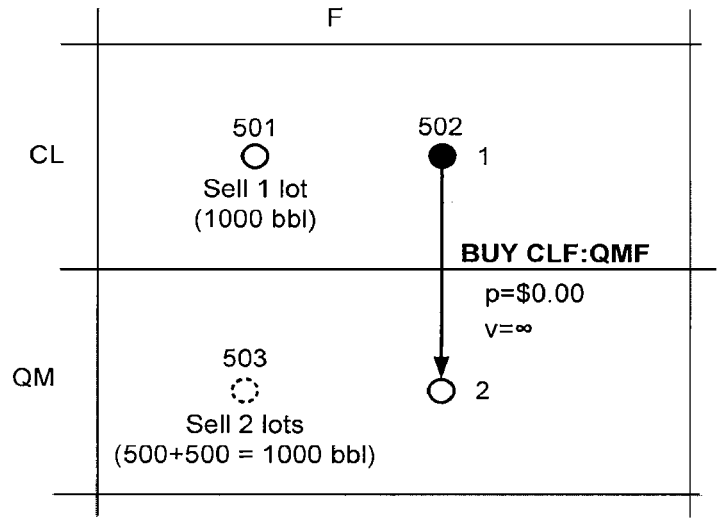
FIG. 5A and FIG. 5B illustrate the creation of an implied sell order from a real outright and a ratio spread.
Figure 5B:
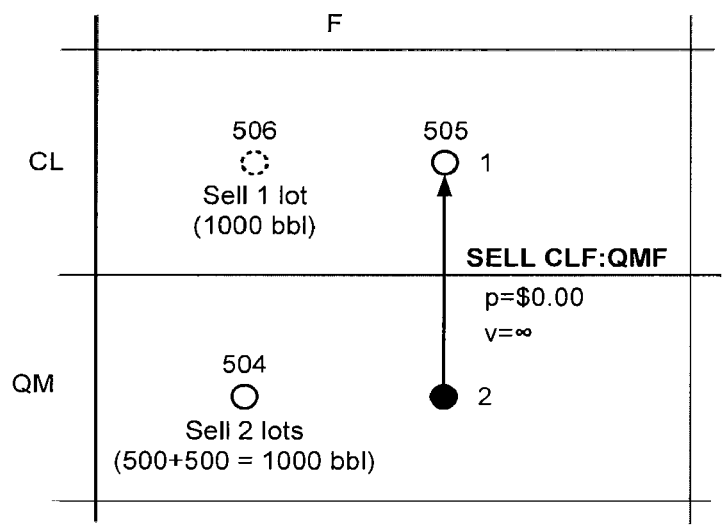

If the exchange defines CLF:QMF (1:2) as a tradable contract then the Match Engine 106 may use implication to make liquidity in the full size contract available to traders of the small contract. FIGS. 5A and 5B illustrate the CL:QM (1:2) tradable ratio spread. In FIG. 5A, the combination of the sell CLF order 501 entered by a trader and the buy spread 502 implies a sell QM order 503 for two lots. The Match Engine 106 uses rules of implication to prevent trades with incoming orders to buy QM that do not have an even number of lots. For example, the Match Engine 106 may limit the creation of implied orders to the pattern shown in FIG. 5B. In this example, an order or orders to sell two lots of QM have been aggregated to form a two-lot offer 504 and has been combined by the Match Engine 106 with the sell spread 505 to imply a one lot buy 506 in CL. If there is an odd quantity offered for sale in QMF, half that quantity rounded down to the closest integer will be offered for sale in CLF. If there is only one lot offered for sale in QMF then no implied lots from the CL:QM (1:2) spread will be offered in CLF.

In one embodiment, linking spread contracts includes calculating and/or assigning a number of lot points for each linked contract. Calculating the number of lot points for each contract may include determining the lot size of the full size contract, determining the lot size of the one or more small contracts, comparing the lot sizes of the full size contract and one or more small contracts, and determining lot points for each contract such that the lot points assigned to the full size contract (i.e., big volume) is an integer multiple of the lot points assigned to the one or more small contracts (i.e., small volumes). For example, as shown in Table 1, if the 1000 barrel CL contract for 1 lot is defined as having 60 "lot points", the 500 barrel QM contract for 1 lot is represented by 30 "lot points". A hypothetical 100 barrel contract would have six lot points. The number of lot points in the full size contract is also referred to as the full lot scaling factor.

In one embodiment, the initial lot size for the full size contract may be determined by the exchange's market development plan and the characteristics of the computer devices 114, 116, 118, 120 and 122 as used by those with whom the exchange plans to do business. If the plan calls for a full size contract to be launched initially for large market participants and for half-size and tenth-size small contracts to follow in subsequent years, the exchange can seek regulatory approval for a contract lot size at one tenth of the planned full size contract size. The initial full size contract is implemented with the small lot size and a minimum volume increment of ten lots. To launch the subsequent small contracts, the exchange need only reduce the minimum volume increment. Internally, however, the trading system assigns the large increment orders to a separate full size contract and links these with zero-price infinite volume spreads to the small contracts. The ordinary rules of implication for ratio spreads take care of matching full size contract orders with multiple small contract orders.

When an implied order calculated in this manner is in a full size contract, there will always be sufficient volume in the component orders to trade with an order in the full size contract. If the implied order is in a small contract, then the Match Engine 106 sets a minimum volume to be traded. Accordingly, an implied bid for an untradeable quantity can exceed a real bid in the same market by enough to meet or exceed the real offer on the other side. This is not a problem for the Match Engine 106, but may require the Exchange to set additional rules for the publication of market data so that implied price levels do not appear to show locked or crossed markets. In an implementation, this is done by requiring the implied order to function as an "all or nothing" type order for the minimum required number of lots, with these being replenished after trading in the manner of an "iceberg" order, both of which are common in electronic trading systems. Those of skill in the art will appreciate that this is only an example and that a wide variety of alternatives are possible.

The volumes available in the different size contracts may be reported separately in the market data. This prevents the market data from showing a crossed market (bids greater than asks) when, for example, the bids are higher in the small contract but there are not enough of them to match with an order in the full size contract. The exact market data format is tailored to the needs of the brokers and other trading entities whose software interacts with the exchange, for example through computer devices 114, 116, 118, 120 and 122, with a view to attracting the small volume hedgers to whom the small contracts are being marketed. Those of skill in the art will appreciate that the size relationship between the contracts can be established with many different full lot scaling factors. If additional contract sizes or types of spreads are required beyond the original marketing plan, new scaling factors can be easily calculated either manually or automatically by the match engine when the contract definitions are encountered at startup. It is understood that new small contracts with sizes smaller than the lot size used to establish the initial set of related contracts cannot be implemented by reducing the volume increment below one, but would instead be launched as separate contracts in the same manner that mini contracts have been traditionally defined.

In an embodiment, the Match Engine 106 may create and maintain the spread orders internally with prices of "p=$0.00" and volumes of "v=.infin." so that the real and implied orders in CL and QM have their prices locked together and any quantity of contracts can be exchanged. In FIG. 5B, any time that there is an even quantity offered for sale in QMF, exactly half that quantity will be offered for sale in CLF. The cost of liquidating any unbalanced positions when the contracts expire is borne by the exchange as a market development cost for acquiring new customers. It is understood that the costs of such liquidation are different for spreads between financially settled contracts, spreads between physically settled contracts in the same product and for spreads between financially settled and physically settled contracts.

In one embodiment, the Match Engine 106 may create internal orders that link small contracts and full size contracts according to the data in exchange-specific tags in the FIX security definition messages, a practice allowed by the FIX Protocol. In another embodiment, such orders are a special type of order read from an order table in the same manner as good-through-date (GTD) or good-till-canceled (GTC) orders are read in prior-art systems, for example from the Order Books Module 110 in FIG. 1. In another embodiment the ratio spreads are traded as ordinary contracts and no additional order initialization is required. Those of skill in the art will appreciate that a wide variety of initialization methods can be used.

Figure 6:
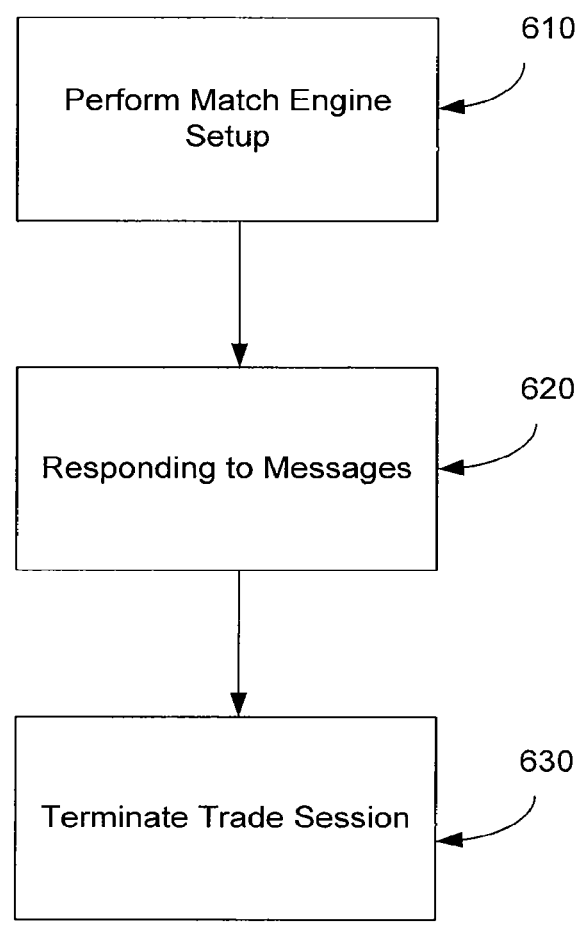
FIG. 6 illustrates one embodiment of a method for performing match engine activities.

FIG. 6 illustrates a method 600 for providing ratio spread orders as tradable instruments. The method 600 may include any ordered combination of the acts shown in FIG. 6 as well as additional, fewer, or different acts deemed necessary or desirable to provide or define ratio spread orders. The method 600 may be implemented using the Match Engine 106 of FIG. 1 or a different device or system.

FIG. 6 illustrates a method 600 for matching trade orders. The method 600 may include performing match engine setup 610, matching orders 620, and terminating a trade session 630. Match engine setup may be performed before the match engine receives orders. During a trade session, the match engine may respond to messages for one or more orders. Accordingly, performing match engine setup 610 may be performed during a "setup state" and responding to messages 620 may be performed during a "trading state." During the trading state, the match engine is configured to match newly arriving orders with previously received orders. The results of the matching may be published in the form of execution reports and market data.

The method 600 may be used to match orders in a ratio spread contract. A ratio spread contract is a composite contract, which may also be referred to as a strategy or strategy contract, defined as the simultaneous buying of a first quantity of a first contract and selling a second quantity of a second contract where the two quantities are in a specified ratio. Although it is possible for the first and second contracts to themselves be strategies, in practice it is more common to define complex strategies in terms of a larger number of simpler components, also referred to as legs. Those of skill in the art will appreciate that many equivalent contract definitions are possible and that the definition used in a specific embodiment may depend on how other parts of the trading system have been implemented.

In a real trade, an order to buy the ratio spread is matched with an order to sell the ratio spread. In an implied trade, an order to buy the ratio spread may be matched with a real order to sell the first contract and a real order to buy the second contract since the combination of these two real outright orders implies an order to sell the spread. It is also possible to imply either the buy or sell spread order with other combinations of orders for outrights and spreads. When a trader places an order for a ratio spread, the trader may be guaranteed to receive fills in every component of the ratio spread as part of the same transaction. In contrast, trading the component contracts individually exposes the trader to leg risk, where a sudden change in the market can result in fills at unwanted prices or even no fills at all, leaving the trader with the cost of backing out of an unwanted position. One of the major advantages of implication is that it eliminates leg risk and spreads liquidity through all of the contracts that can be linked together in combinations.

Figure 7:
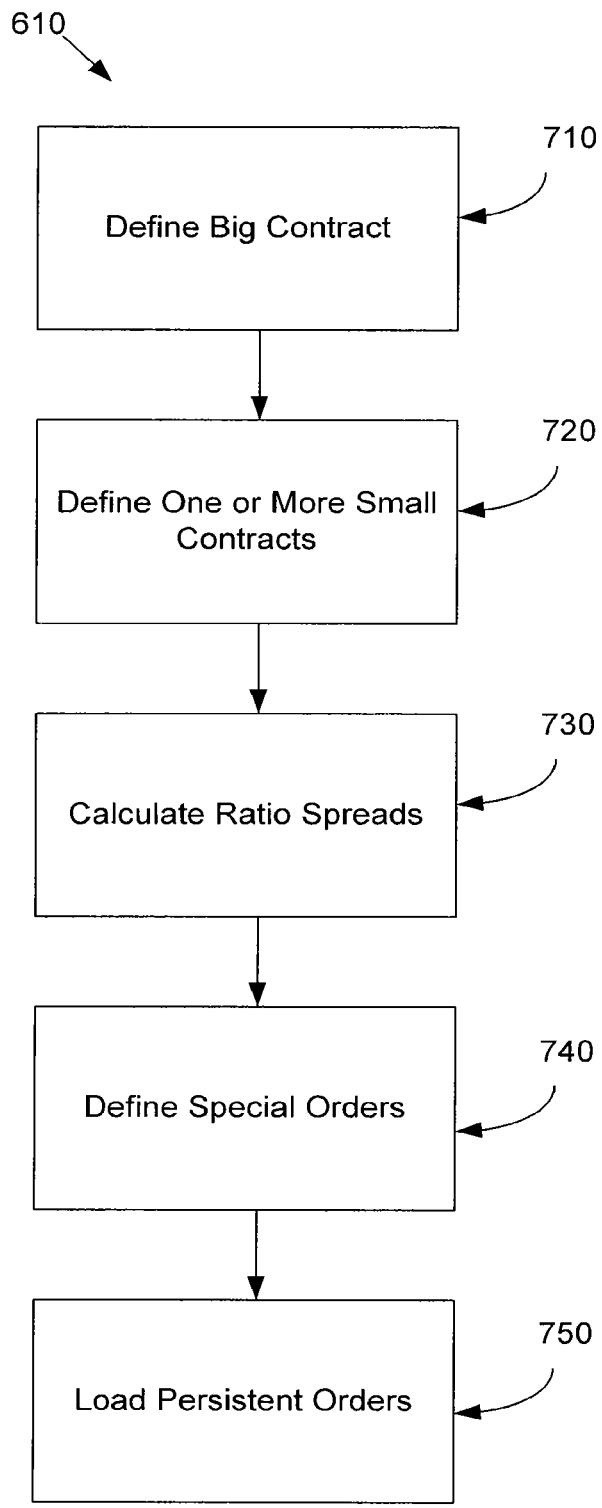
FIG. 7 illustrates one embodiment of a method for performing match engine setup.

FIG. 7 illustrates one embodiment of a method for performing match engine setup 610. Match engine setup is performed in order to prepare the match engine for providing ratio spreads during the trading state.

In order to perform match engine setup, a match engine may define a full size contract 710 and one or more small contracts 720. Defining the full size contract 710 and/or one or more small contracts 720 may include reading a security definition message. The match engine may access, request and/or receive the security definition message and/or the definitions therein from one or more databases or files that the trading system uses to inform traders of the instruments that can be traded. Once obtained, the match engine may read the security definition messages and define the contracts defined therein.

The match engine may define a ratio spread contract as shown in act 730. The definition of the ratio spread contract may include assigning lot points to one or more of the contracts. The number of lots points assigned to a small contract may be based on the volume of the small contract relative to the volume of the full size contract, as well as the number of lot points assigned to the full size contract. The number of lot points assigned to a full size contract may be such that the number of lot point for the full size contract is the least common multiple of the lot points assigned to the one or more small contracts.

TABLE 2 illustrates one example of assigning lot points to contracts RB, RB21, and RB6. TABLE 2 corresponds to FIG. 9. Contract RB corresponds to the New York Mercantile Exchange's reformulated gasoline blendstock for oxygen blending (RBOB), physically delivered in New York harbor in lots of 42000 gallons (equivalent to 1000 barrels), and thus, is represented symbolically by "RB". Contract RB is assigned 42 lot points. Contract RB21, which has half the volume as contract RB, is assigned half the lot points as contract RB. Contract RB6, which has a seventh of the volume as contract RB, is assigned a seventh of the lot points as contract RB.

TABLE 2

| CONTRACT (RBOB) | VOLUME OF CONTRACT (gallons) | LOT POINTS ASSIGNED TO CONTRACT |
|---|---|---|
| RB | 42000 | 42 lot points |
| RB21 | 21000 | 21 lot points |
| RB6 | 6000 | 6 lot points |

As shown in TABLE 2, the full size contract, which is contract RB, is assigned a number of lot points that is a least common multiple of the number of lot points as the other two contracts RB21, RB6. The procedure is illustrated here for a simple group of contracts with the same underlying physical unit. It is understood that other physical units such as barrels, metric tons, British Thermal Units, kilowatt hours and so forth can be accommodated to any desired accuracy by making the number of lot points in the biggest contract sufficiently large.

Figure 9:
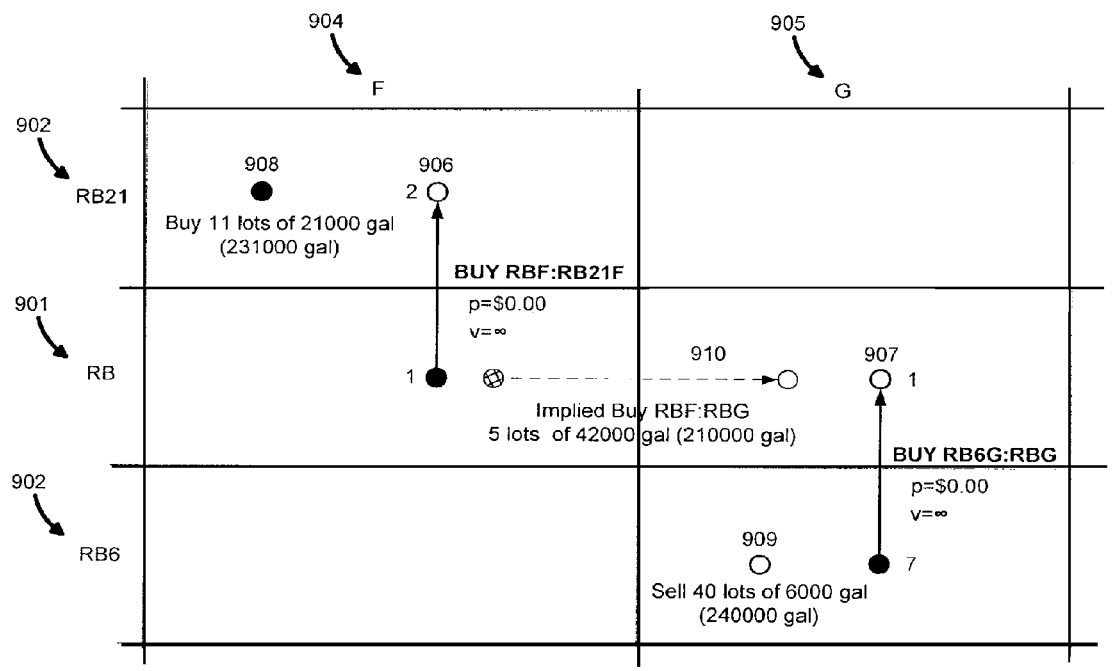
FIG. 9 illustrates the creation of an implied buy spread order in a full size contract from outright contracts in linked small contracts.

The number of lot points for each contract may be used to determine the volume of implied orders. For example, as shown in FIG. 9, resting orders in different contracts with different number of lot points per contract lot are shown implying a January to February spread (RBF:RBG) in the full size contract RB. When defining the ratio spread contract RB:RB21, the match engine may use the lot points to determine that one (1) contract RB is being bought and two (2) contracts RB21 are being sold. In another example, the combination contract RB6:RB may indicate that seven (7) contracts are being bought and one (1) contract is being sold. Accordingly, ratio spread for combination order RB6:RB may be 7:1. From the trader's standpoint, these ratio spreads may be referred to as either a 2:1 and 7:1 ratio spreads or as 1:2 and 1:7 ratio spreads, since the convention of buying multiple minis and selling one big (or vice versa) will always be clear from the context. Those of skill in the art will appreciate that an exchange can express one convention externally, such as "buy the ratio spread" means "buy the full size contract and sell the mini" while maintaining different conventions internally to simplify the arithmetic of implication.

Referring back to FIG. 7, the match engine may define one or more special orders, as shown in act 740. Special orders are matched and traded in the same way as ordinary orders but are coded in such a way that the match engine can apply special rules not available to ordinary traders, but which allow the engine's generic order matching logic to be used for other exchange business needs. For example, the match engine can define special orders that will only trade as components in an implied combination, which would allow the engine to maintain orders in spread contract where the bid price is identical to the asking price or fractionally better. This technique could be used to automatically convert bids for one contract into bids for a linked contract through simple implication. Exemplary special orders include ratio spread orders with special properties such as zero prices and infinite volumes. However, other special orders may be used, such as orders with slightly different lot point volumes or internally scaled prices to express differences in trading priority that are recognizable to the match engine but invisible to the outside world when the prices and volumes are rounded to standard values. Special orders are useful because they reduce the amount of computer program code and subsequent testing required to implement new trading system requirements.

Defining one or more special orders may include loading the special orders from a database. The special orders may be read in the same way as persistent orders such as good-through-date (GTD) or good-till-canceled (GTC) orders are read in prior-art systems, for example from the Order Books Module 110 in FIG. 1. In an implementation, the special orders are previously entered into the database using a program designed for this purpose and the codes used to identify the special orders are checked by the match engine when the database is being read. The match engine loads only the orders whose codes it has been programmed to recognize and informs the operator of the trading system if orders with unrecognizable codes have been encountered.

As shown in act 750, the match engine may load persistent orders. Persistent orders may be past orders that were not completely filled in a previous trading session but whose properties require them to be carried forward to the subsequent session. For example, persistent orders include good-through-date (GTD) or good-till-canceled (GTC) orders. In an implementation, the match engine causes the Order Books Module 110 in FIG. 1 to be updated as orders are entered, modified, canceled or filled during the trading session. At the end of the trading session, the Order Books Module 110 removes orders that do not have the properties of persistence. During the setup state for the subsequent session, the match engine sends a query to the Order Books Module 110 or its associated database, obtains the data for the persistent orders in the form of a record set, iterates the record set and stores the orders internally in the data structures used to represent the order book.

In one embodiment, the ratio spreads, which are supported by the match engine, may be displayed. Displaying the ratio spreads may include sending ratio spread data to one or more computer devices, such as computer devices 114, 116, 118, 120 and 122. The one or more computer devices may receive the ratio spread data and display a representation of the ratio spreads on a monitor for a broker or other trading entity to view. Displaying the ratio spreads is not necessary. For example, the ratio spread data may be transmitted to a computer device and processed automatically by the computer device.

A trader or trading entity may view the ratio spreads and decide that it is advantageous, either financially or strategically, to place an order for one or more of the ratio spreads.

Referring back to FIG. 6, once the match engine completes match engine setup, the match engine may begin responding to messages 620. As used herein, "responding to messages" may include receiving new orders, matching the new orders with real or implied orders, publishing market data, or any combination thereof. Additional, different, or fewer acts may be provided in responding to messages.

Figure 8:
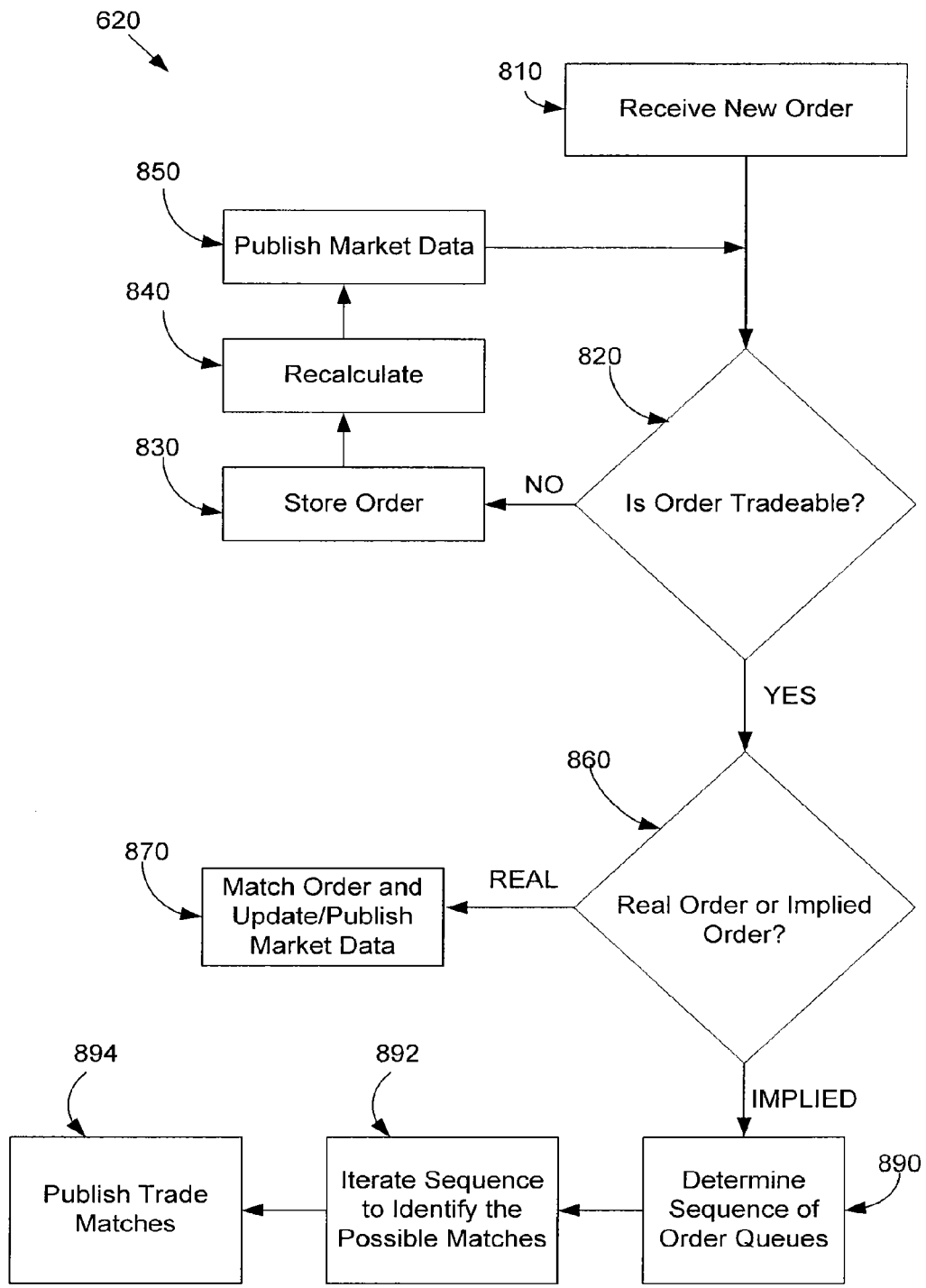
FIG. 8 illustrates one embodiment of a method for matching orders.

FIG. 8 illustrates one embodiment of responding to messages 620. The match engine may receive a new order message 810. The new order message may define a new order, for example, placed by the trader or trading entity. The new order may be an order for a ratio spread. As used herein, the term "new order message" may include all messages that result in a change to the order book state, such as messages which modify or cancel previously entered orders or which change the tradability of orders or groups of orders. Those of skill in the art will appreciate that messages affecting contracts and groups of contracts can also affect the tradability of orders, for example by opening or closing a market and thereby changing the implied markets that can be calculated and published. It is understood that the term "new order" is used to simplify the exposition and not to limit the scope of lot point calculations.

For example, as shown in FIG. 9, the match engine may receive one or more outright orders, such as BUY RB21F 908 and SELL RB6G 909. The outright order 908 may be an order to buy 11 lots of RB21 and outright order 909 may be an order to sell 40 lots of RB6. In an implementation, the trader may use a computer device, such as computer device 114, to send a new order message to buy or sell a specified quantity of the ratio spread RBF:RB21F to the match engine. In another implementation, the order for the ratio spread RBF:RB21F is a special order loaded by the match engine during the setup phase that can be used in implication but not directly traded against another order in the same contract.

The match engine may calculate an implied order in any contract where the necessary linking contracts exist and where these contracts contain resting orders on the appropriate sides, which may be either stored in memory during the setup state or previously received as new orders. For example, as shown in FIG. 9, the 1:2 ratio spread for RB:RB21 in January 906 and the 7:1 ratio spread for RB6:RB in February 907 may be combined with the outright orders 908, 909 to imply the BUY RBF:RBG spread order 910. In order to calculate the number of lots in the implied BUY RBF:RBG spread, the maximum possible implied volume is calculated as the minimum of the volumes in the chain of orders. The finite volume components constrain the available volume to 231 lot points (231,000 gallons) in RB21F and 240 lot points (240000 gallons) in RB6G. The minimum is 231 lot points, which must then be divided by the number of lot points in the implied contract to determine the number of implied lots. In this case the RBF:RBG spread is a full size contract with 42 lot points (one lot equals 42000 gallons) so the implied volume is 5.5 (231 divided by 24). This may be rounded down to the nearest integer in order to publish a tradable quantity, which in this case is 5 lots. It is understood that rounding down may on occasion result in a tradable quantity of zero.

Referring back to FIG. 8, once the outright contracts and the implied ratio spreads have been defined and one or more orders have been received, the match engine may determine whether a new order is tradable against a previously received order in a real trade or a combination of previously received orders in an implied trade 820. In general, a new buy order is tradable if its price is greater than the asking price of a resting real order for a real trade or greater that the appropriately weighted sum of the bid and ask prices in the resting buy and sell orders that form the implied order for an implied trade. In an implementation, the match engine may give preference to real or implied orders on the basis of price, volume, time of entry, ownership or some combination of these and other factors.

In the event that the new order is not tradable "NO," the match engine may store the new order 830 in memory, update the market data 840, and publish the market data 850. Updating the market data 840 may include updating the properties of an order queue to reflect the fact that an order has been stored for a particular contract. The updated market data may be published so that traders may be aware that one or more orders are present in the market to buy or sell specified quantities of contracts at specified prices and that these have changed as a result of the match engine receiving its most recent message.

In the event that the new order is tradable "YES," the match engine may determine whether the order should be traded against a resting real order or against a resting implied order 860. In an implementation, the match engine computes all the possible combinations of resting orders that can be traded as implied orders and stores these as part of the order book state before receiving the next new order. The price of an implied order in a given contract is therefore available for comparison with the price of any real order in that contract and with the price of the incoming order so that a decision may be made as to whether the incoming order is tradable and if so, whether it should be traded against the real order or the implied order. Those of skill in the art will appreciate that any or all of the properties required to establish the relative priority of the implied and the real order may be computed prior to the receiving of a new order. Those of skill in the art will also appreciate that the technique of "lazy evaluation" may be applied to these calculations, so that the actual calculations are only performed once the need for their results has been determined, possibly after the receiving of the new order in a part of the match engine but before some other part performs the comparison.

When the trade is with a resting real order "REAL", the match engine may match the new order, update the market data, and publish the updated market data 870.

When the trade is with a resting implied order "IMPLIED," the match engine may determine the sequence of order queues 890, iterate sequence to identify possible matches 892, calculate trades 894, and publish trade matches 896. Additional, different, or fewer acts may be provided.

Figure 10:
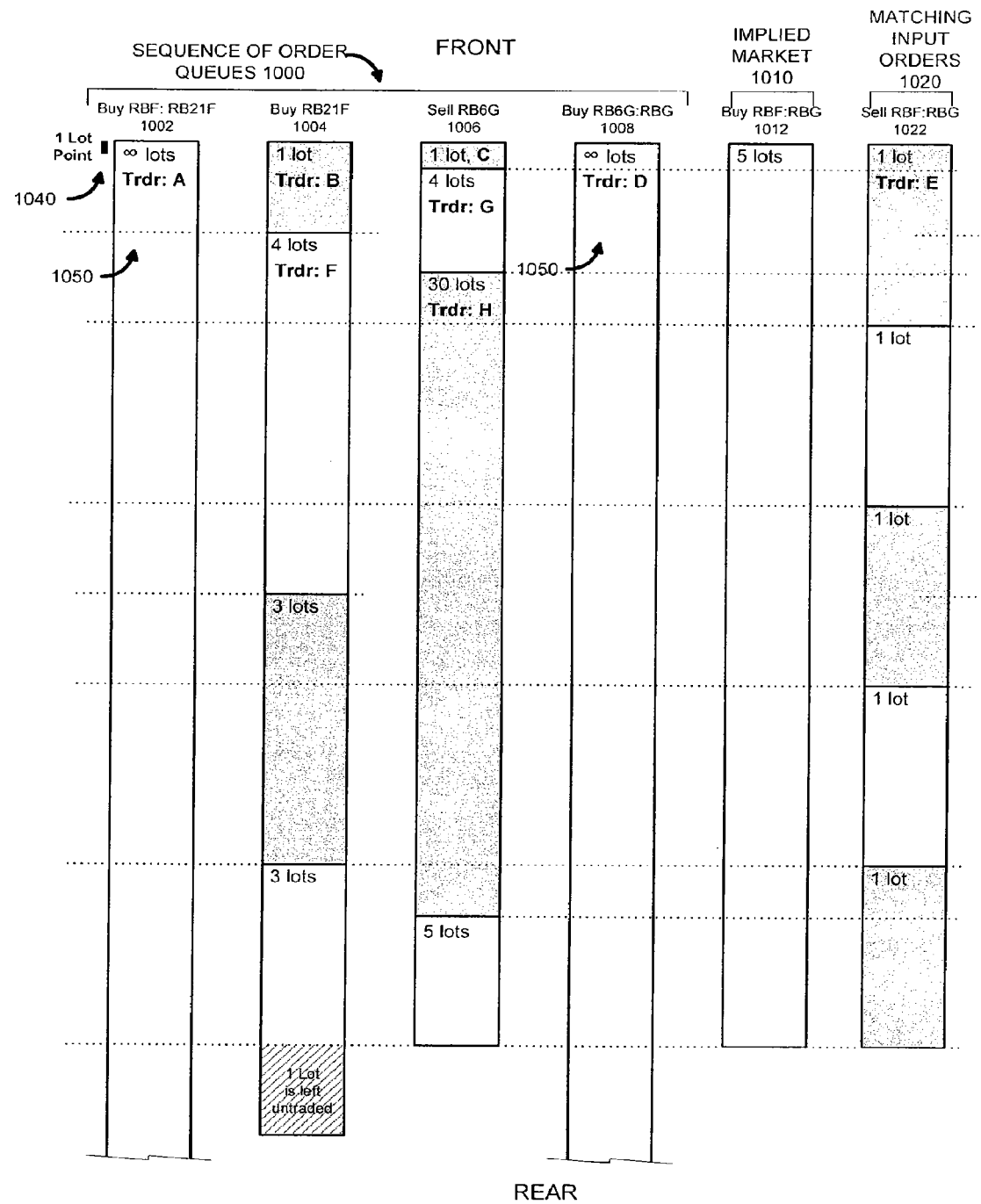
FIG. 10 illustrates how traders' orders for differing quantities in contracts of different lot sizes can be assembled into matched trades when the implied buy spread order of FIG. 7 is traded with an incoming real order.

In act 890, the match engine determines the sequence of order queues. Determining the sequence of order queues may include identifying the contracts that are linked together to form the implied chain and selecting the order queues for the best price levels in each of these contracts to form a sequence of order queues. FIG. 10 illustrates a sequence of order queues for the real markets 1000, an order queue for the implied market 1010, and an order queue for the matching input orders queue 1030. An order queue is a collection of orders that are kept in a priority sequence. The principal operations on the collection of orders are the addition of orders to the rear terminal position "REAR" and removal of entities from the front terminal position "FRONT". In one embodiment, the order queues may be First-In-First-Out (FIFO) queues. In a FIFO queue, the first order added to the queue will be the first order to be removed. This is equivalent to the requirement that whenever an order is added, all elements that were added before have to be removed before the new order can be matched. In another embodiment, the order queue has a comparator function that effectively places the orders in a sequence where the order removed from the front of the queue will be the most significant order according to the rules of comparison. Those of skill in the art will appreciate that a broad range of comparator functions may be implemented in a programming language such as Java or C++, of which FIFO is merely a simple example. The positions of the orders in the order queues of FIG. BB is intended to illustrate the sequence in which they would be removed from the front of the queue, not the sequence of their arrival or their positions in the physical memory of the computing device on which the match engine has been implemented.

Order queues 1002-1008 are used to collect real market orders. For example, order queue 1002 is associated with the order Buy RBF:RB21F; order queue 1002 is associated with the order Buy RB21F; order queue 1006 is associated with the order Sell RB6G; and order queue 1008 is associated with the order Buy RB6G:RBG. Order queue 1010 is associated with the order BUY RBF:RBG 812. The order queue 1020 is associated with the implied order SELL RBF:RBG 1022.

As the match engine receives additional new orders, the match engine may place the orders in the corresponding queues. For example, as shown in TABLE 3, the match engine may receive the following new orders.

TABLE 3

| Trader | Order | Size of Order |
| --- | --- | --- |
| Trader A | BUY RBF:RB21F | ∞ |
| Trader B | BUY RB21F | 1 lot |
| Trader C | SELL RB6G | 1 lot |
| Trader D | BUY RB6G:RBG | ∞ |
| Trader E | SELL RBF:RBG | 1 lot |
| Trader F | BUY RB21F | 4 lots |
| Trader G | SEELL RB6G | 4 lots |
| Trader H | SELL RB6G | 30 lots |

The orders shown in TABLE 3 are illustrated in FIG. 10. In FIG. 10, each order is shown as a rectangle whose vertical dimension is an integer number of lot points 1040. The integer number of lot points may be determined based on the size of the order. The ratio spreads 1050, are shown with infinite volume. The ratio spreads have a lot size equal to that of the full size contract in their full size contract legs and a lot size equal to that of the appropriate small contract in small contract legs. The ratio spreads have the property of being able to trade with one trader on the big side and any number of traders on the small side.

Referring back to FIG. 8, the match engine iterates the sequence of order queues to identify the possible matches, in act 892. In an implementation, the sequences of contracts that make up the implied chains have been calculated prior to the receiving of a new and tradable order. When the new order is received and determined to be tradable against an implied order, the sequence of contracts in the implied order is retrieved from the memory of the computing device on which the match engine has been implemented. In an implementation, the sequence is stored in a data type referred to in a programming language such as Java or C++ as a collection or as similar a class of objects on which a special type of variable called an iterator can be defined. Such a data type provides methods in the form of callable subroutines which may be called repeatedly, whereby each call returns the next order queue in the sequence that makes up the chain. The match engine, which is implemented as a computer program, uses a loop to call the appropriate methods and after each call, performs the operations that are needed to obtain the front element of each order queue (an order) and record the fact that this order has participated in a trade. For example, the order's working quantity may be decremented and an execution report published to the owner of the order to indicate that the status of the order has changed. When all of the order queues in the implied chain have been processed in this manner the loop terminates. Those of skill in the art will appreciate that the traders associated with individual orders will receive individual execution reports and that the trading system will record individual changes in position for the individual traders. The constraint that every decrease in the holdings of one trader must be matched with a corresponding increase in the holdings of another trader is imposed by the match engine. In a real trade there are only two parties and the increase to one party is clearly matched with the decrease to the other. In an implied trade there may be many parties and many pairwise trades.

In FIG. 10, a sequence of pairwise trades is referred to as a "baloney slice", whereby a sequence of paired trades satisfying the aforementioned constraints is "sliced" from the fronts of the order queues in the sequence. In a first trade, the match engine determines that Trader E (the incoming order) sells 1 lot of RBF (42000 gallons) to Trader A and buys 1 lot of RBG from Trader D. Trader A buys 1 lot of RBF (42000 gallons) from Trader E and sells 1 lot of RB21F (21000 gallons) to Trader B and 1 lot of RB21F (21000 gallons) to Trader G. Trader D buys 1 lot of RB6G (6000 gallons) from Trader C, 4 lots (24000 gallons) from Trader G and 2 lots (12000 gallons) from Trader H. Trader D then sells 1 lot of RBG (42000 gallons) to Trader E, which completes the transactions for Trader E. The Match Engine can then move on to the next input order and repeat the matching procedure. Trader A has effectively bought one full size contract and sold two small (half-size) contracts. Trader D has bought 7 small (one seventh size) contracts and sold one full size contract. The other traders have bought or sold contracts of a single size.

Finally, in act 894, the match engine publishes the trades data and the market data reflecting the trade matches that have taken place. Those skilled in the art will appreciate that although some trade data is typically included in the market data published to all traders, specific trade data may be published separately to components of the trading system outside the match engine, including, for example, the details needed for accounting. The emphasis on market data in the present exposition is not intended to preclude these other forms of communication in a specific trading system. Moreover, market data may originate in the match engine but be formatted for transmission to traders and other interested parties by a separate Market Data Module 112 as shown in FIG. 1. The market data may be included in a message formatted according to the FIX Protocol. A market data message may report the quantity available at a price level rather than an individual order. As such, it can use different tag-value pairs to report volume in small contracts and full size contracts. The FIX Protocol allows any number of price levels to be published in a market data incremental refresh has a specified format for implied markets. Moreover, the FIX Protocol allows an exchange to define additional "exchange-specific" tags according to the needs of its customers. Those of skill in the art will appreciate that the linkage of liquidity made possible by ratio spreads and implication inside the match engine and can be expressed to the trading community using a wide variety of established techniques.

Referring back to FIG. 6, the match engine may terminate a trade session 630. The match engine may terminate the trade session when a fatal error is detected, the system administrator ends the trade session, or the trade session times out.

Figure 11:
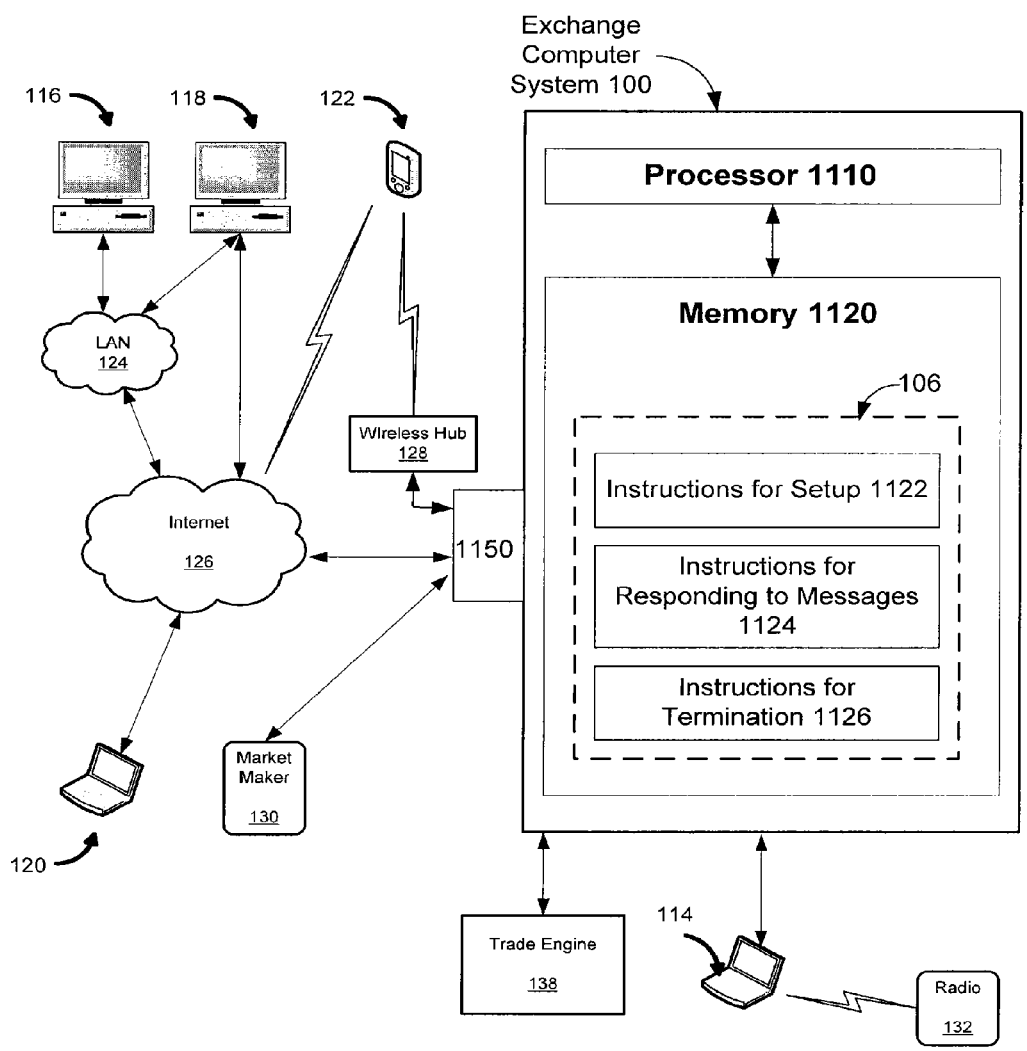
FIG. 11 illustrates one embodiment an electronic trading system.

FIG. 11 illustrates one embodiment of an Electronic trading system 100. The Electronic trading system 100 may be a personal computer, server, electronic device executing computer executable code, or other processing unit. The Electronic trading system 100 may be manufactured, distributed, configured, programmed, or sold for trading purposes, such as mixing contracts of different sizes.

The Electronic trading system 100 may include a processor 1110 and memory 1120. Additional, different, or fewer components may be provided. For example, in one embodiment, the Electronic trading system 100 may include a display. The display may be local to the Electronic trading system 100. Alternatively, the display may be independent disposed at a remote location. The remote location being at a location different than the location where the Electronic trading system 100 is disposed.

The processor 1100 may be operable to execute instructions stored on or in the memory 1120. The memory 1120 may store instructions that may be executed for trade matching For example, as shown in FIG. 11, the memory 1120 may store instructions that may be executed to perform match engine setup 1122, instructions that may be executed to respond to messages 1124, and instructions that may be executed to terminate a trade session 1126.

The instructions for performing match engine setup 1122 (hereinafter, "instructions 1122") may be executed by the processor 1100 to perform match engine setup. The instructions 1122 may include instructions that may be executed to define a full size contract, define one or more small contracts, calculate ratio spreads, define special orders, and load persistent orders, or any combination thereof.

The instructions for responding to messages 1124 (hereinafter, "instructions 1124") may be executed by the processor 1100 to respond to messages. The instructions 1124 may include instructions executable to receive one or more real orders via a communication network. The instructions 1124 may also include instructions that may be executed to generate an implied order, one or more components of the implied order being a ratio spread linking two contracts that have been specified with a common product but with trading units of different sizes. The instructions 1124 may include instructions executable to match the one or more orders with other real orders or the implied order.

In one embodiment, the instructions 1124 may include instructions that are executable to instructions executable to define a full size contract and a small contracts as the two contracts; assign lot points to the full size contract and the one or more small contracts, the lot points being used to associate a volume of the one or more small contracts with a volume of the full size contract; and create a ratio spread in a way that liquidity in the full size contract is available to traders of the one or more small contracts, the ratio spread orders being created based on the lot points assigned to the full size contract and the one or more small contracts. A number of lot points may be assigned to the full size contract such that the number of lots points for the full size contract is a least common multiple of a number of lots points assigned to the one or more small contracts. The instructions 1124 may include instructions executable to determine a minimum volume of the one or more small contracts; and instructions executable to divide the minimum volume of the small contracts by a volume of the large contract and rounding to the nearest full integer, the ratio spread of the implied order being set equal to a nearest full integer.

The instructions for terminating a trade session 1126 (hereinafter, "instructions 1126) may be executed by the processor 1100 to terminate a trade session.

One skilled in the art will understand that other instructions may be stored in the memory 1120. Additionally, or alternatively, the instructions may be separated into individual components that are or are not paired with the other instructions. For example, the instructions 1122 may or may not include instructions for defining ratio spread contracts. The instructions for defining ratio spread contracts may be provided in a different set of instructions that are independent of the instructions 1122.

The processor 1110 may be may be a general processor, digital signal processor, application specific integrated circuit, field programmable gate array, analog circuits, digital circuit, combinations thereof, or other now known or later developed processors. The processor 110 may be a single device or a combination of devices, such as associated with a network or distributed processing. Any of various processing strategies may be used, such as multi-processing, multi-tasking, parallel processing, or the like. Processing may be local, as opposed to remote. The processor 1110 may be responsive to instructions stored as part of software, hardware, integrated circuits, firmware, micro-code or the like.

The memory 1120 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 1120 may be a single device or a combination of devices. The memory 1120 may be adjacent to, part of, networked with, programmed with, and/or remote from the processor 1110. The memory 1120 may store data representing instructions executable by the programmed processor 1110. The processor 1110 may be programmed with and execute the instructions. The functions, processes, acts, methods or tasks illustrated in the figures or described herein may be performed by the programmed processor executing the instructions stored in the memory. The functions, acts, processes, methods or tasks are independent of the particular type of instructions set, storage media, processor or processing strategy and may be performed by software, hardware, integrated circuits, firm ware, micro-code and the like, operating alone or in combination.

As shown in FIG. 11, the match engine 106 may include an input and/or output 1150. The input and/or output 1150 may be configured to transmit and/or receive data. For example, in one embodiment, the input and/or output may be an interface to a network. A network cable may plug-in to the input and/or output 1150. The input and/or output 1150 may be electrically coupled with the processor 1110 and may relay data from the network to the processor.

In one embodiment, an input may be configured to receive one or more new orders and an output may be configured to receive the implied order from the processor and transmit the implied order to a trade machine used for placing trades.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A computer implemented method comprising:
receiving, by a processor, a first order to trade a first quantity of at least a first contract, the first contract being characterized by an underlier and a first size indicative of a first volume of the underlier represented by the first contract;
determining, by the processor, whether one or more other orders have been previously received which are counter to the first order and for at least a collective second quantity of a second contract or a combination of at least the first contract and the second contract, the second contract being characterized by the underlier and a second size indicative of a second volume of the underlier represented by the second contract, the second size being different from the first size;

determining, by the processor, when the previously received one or more orders are for the second contract whether a first product of the first quantity multiplied by the first size is equivalent to a second product of the collective second quantity multiplied by the second size;

determining, by the processor, when the previously received one or more orders are for the combination of the first and second contracts whether a third product of the first quantity multiplied by the first size is equivalent to a fourth product of the collective second quantity multiplied by the first size and whether a fifth product of the collective second quantity multiplied by the second size is equivalent to a sixth product of a third quantity of a second previously received order for the second contract multiplied by the second size; and executing, by the processor, a trade between the first order and the one or more other orders when the first product is equal to the second product and executing, by the processor, a trade between the first order, the one or more other orders and the second previously received order when the third product is equal to the fourth product and the fifth product is equal to the sixth product.

2. The computer implemented method of claim 1, wherein the first order comprises a combination contract for the first and second contracts.

3. The computer implemented method of claim 1, wherein one of the first size or second size is defined as a unit size, the other of the first size or second size being a multiple of the unit size.

4. The computer implemented method of claim 3, wherein the one or more other orders are orders for full sized contracts defined by a predetermined full size, and the first size of the first contract is less than the predetermined full size.

5. The computer implemented method of claim 3, wherein lot points are assigned to a full sized contract and a small contract such that the number of lot points for the full sized contract is a multiple of a number of lot points assigned to the small contract.

6. The computer implemented method of claim 1, further comprising:
resting, by the processor, the first order when it is determined that the first product is not equal to the second product the third product is equal to the fourth product and the fifth product is equal to the sixth product, and receiving additional orders counter to the first order.

7. The computer implemented method of claim 1, further comprising;
identifying, with the processor, a proposed match between the first order, the one or more other orders and the second previously received order when the third product is equal to the fourth product and the fifth product is equal to the sixth product; and
publishing, on a display, the proposed match as market data.

8. The computer implemented method of claim 1, further comprising;
identifying, with the processor, a proposed match between the first order and the one or more other orders when the first product is equal to the second product; and
publishing, on a display, the proposed match as market data.

9. The computer implemented method of claim 1, wherein the one or more other orders comprises a calendar spread.

10. A computer implemented method comprising:
receiving, by a processor, a first order for a first quantity of a first contract, the first contract characterized by an underlier and a first volume;

identifying, by the processor, whether there is at least one previously received order for a second quantity of a second contract, the second contract characterized by the underlier and a second volume;

identifying, by the processor, whether there is at least one previously received combination contract order for a third quantity of combination contracts, wherein the combination contract comprises a third contract characterized by the underlier and a third volume, and a fourth contract characterized by the underlier and a fourth volume;

determining, by the processor,
a first product where the first quantity is multiplied by the first volume,
a second product where the second quantity is multiplied by the second volume,
a third product where the third quantity is multiplied by the third volume, and
a fourth product where the third quantity is multiplied by the fourth volume; and executing, by the processor, the steps of;
a first trade between the first order and the previously received order when the first order and the previously received order are counter and the first product is equal to the second product,
a second trade between the first order and the existing combination contract order when the when the first order and the existing combination contract order are counter and the first product is equal to the sum of the third product added to the fourth product, and
a third trade between the first order, the previously received order and the existing combination contract order when the first order is counter to part of the combination contract order, the previously received order is counter to another part of the combination order, the first product is equal to the third product and the second product is equal to the fourth product.

11. The computer implemented method of claim 10, wherein the first volume is representative of a full sized volume as defined by an exchange or a government body.

12. The computer implemented method of claim 11, wherein the second volume is representative of a less than full sized volume, the less than full sized volume sized such that the full sized volume is a multiple of the less than full sized volume.

13. The computer implemented method of claim 12, wherein the full sized volume is a volume corresponding to a CL contract for West Texas Intermediate Crude Oil and the less than full sized volume is a QM contract for West Texas Intermediate Crude Oil.

14. The computer implemented method of claim 13, wherein the third contract has a price of zero, the third volume is infinite, and the third product is further determined by multiplying the third contract price with the third volume and the third quantity.

15. A trading environment comprising:
one or more trading workstations for entry of a plurality of orders;
a communication network coupled to the trading workstations;
a trade matching system coupled to the communication network, wherein the trade matching system comprises, a processor and a computer readable non-transitory storage medium with instructions executable by the processor, the instructions executable to:

receive a first order from a trading station via the communication network for a first quantity of a first contract, the first contract characterized by an underlier and a first volume;

identify whether there is at least one previously received order for a second quantity of a second contract, the second contract characterized by the underlier and a second volume;

identify whether at least one existing combination contract orders for a third quantity of combination contracts, wherein the combination contract comprises a third contract characterized by the underlier and a third volume, and a fourth contract characterized by the underlier and a fourth volume;

determine,
  a first product where the first quantity is multiplied by the first volume,
  a second product where the second quantity is multiplied by the second volume,
  a third product where the third quantity is multiplied by the third volume, and
  a fourth product where the third quantity is multiplied by the fourth volume; and execute the steps of,
  a first trade between the first order and the previously received order when the first order and the previously received order are counter and the first product is equal to the second product,
  a second trade between the first order and the existing combination contract order when the when the first order and the existing combination contract order are counter and the first product is equal to the sum of the third product added to the fourth product, and
  a third trade between the first order, the previously received order and the existing combination contract order when the first order is counter to part of the combination contract order, the previously received order is counter to another part of the combination order, the first product is equal to the third product and the second product is equal to the fourth product.

16. The trade environment of claim 15, wherein the communication network operates using an FIX (financial information exchange) protocol.

17. The trade environment of claim 15, wherein the first volume is representative of a full sized volume as defined by an exchange or a government body.

18. The trade environment of claim 17, wherein the second volume is representative of a less than full sized volume, the less than full sized volume sized such that the full sized volume is an integer multiple of the less than full sized volume.

19. The trade environment of claim 15, wherein the existing combination contract order comprises a system generated combination contract at a price and volume determined by an exchange business objective.

20. The trade environment of claim 19, wherein the third contract has a price of zero, the third volume is infinite, and the third product is further determined by multiplying the third contract price with the third volume and the third quantity.

* * * * *